(12) United States Patent
Tanaka

(10) Patent No.: US 10,876,630 B2
(45) Date of Patent: Dec. 29, 2020

(54) ROD PACKING

(71) Applicant: MITSUI E&S MACHINERY CO., LTD., Tokyo (JP)

(72) Inventor: Masaki Tanaka, Okayama (JP)

(73) Assignee: MITSUI E&S MACHINERY CO., LTD., Tokyo (JP)

( * ) Notice: Subject to any disclaimer, the term of this patent is extended or adjusted under 35 U.S.C. 154(b) by 1 day.

(21) Appl. No.: 16/357,875

(22) Filed: Mar. 19, 2019

(65) Prior Publication Data

US 2020/0088298 A1    Mar. 19, 2020

(30) Foreign Application Priority Data

Mar. 20, 2018   (JP) .................................. 2018-052350

(51) Int. Cl.
*F16J 9/28* (2006.01)

(52) U.S. Cl.
CPC ....................................... *F16J 9/28* (2013.01)

(58) Field of Classification Search
CPC ........................................................ F16J 9/28
See application file for complete search history.

(56) References Cited

U.S. PATENT DOCUMENTS

| 3,214,182 | A | * | 10/1965 | Herbruggen | F16J 15/32 |
| | | | | | 277/465 |
| 3,735,992 | A | * | 5/1973 | Prostorov | F16J 9/28 |
| | | | | | 277/464 |
| 3,897,072 | A | * | 7/1975 | Inka | F16J 9/14 |
| | | | | | 277/459 |
| 4,723,782 | A | * | 2/1988 | Muller | F16J 15/56 |
| | | | | | 277/589 |
| 6,367,808 | B1 | | 4/2002 | Feistel | |
| 2008/0265518 | A1 | * | 10/2008 | Fujioka | F16J 9/28 |
| | | | | | 277/477 |

(Continued)

FOREIGN PATENT DOCUMENTS

| CN | 1187870 A | 7/1998 |
| CN | 2672386 Y | 1/2005 |

(Continued)

OTHER PUBLICATIONS

SIPO First Office Action corresponding to Application No. 201910209919.4; dated Oct. 23, 2019.

(Continued)

*Primary Examiner* — Vishal A Patel
(74) *Attorney, Agent, or Firm* — Cantor Colburn LLP

(57) ABSTRACT

In one surface of a ring member, a plurality of incision grooves incised in a radial direction from an inner peripheral edge up to an appropriate position and those incised from an outer peripheral edge to an appropriate position are alternately formed, and in the other surface, incision grooves continuing from the inner peripheral edge up to the outer peripheral edge are formed. In order to adapt to the expansion and the contraction due to a temperature change and a change in shape and dimension due to abrasion, the inner incision grooves and the outer incision grooves increase/decrease in width, causing the packing to expand/contract in the circumferential direction, so that the packing is capable of maintaining its contact state with a shaft to minimize the leakage of the fluid.

4 Claims, 19 Drawing Sheets

(56) References Cited

U.S. PATENT DOCUMENTS

2016/0298768 A1   10/2016  De Lapersonne et al.
2017/0023135 A1    1/2017  Itou
2019/0049013 A1*  2/2019  Svrcek ..................... F16J 1/09

FOREIGN PATENT DOCUMENTS

| CN | 202074041 U    | 12/2011 |
| CN | 104074829 A    | 10/2014 |
| CN | 203857047 U    | 10/2014 |
| CN | 106369165 A    | 2/2017  |
| DE | 102012218122 A1 | 4/2014 |
| JP | 5773462 U      | 10/1955 |
| JP | H11336908 A    | 12/1999 |
| JP | 2006161769 A   | 6/2006  |
| JP | 2013064504 A   | 4/2013  |
| JP | 5953395 B1     | 7/2016  |
| WO | 2015082497 A1  | 6/2015  |
| WO | 2016176119 A1  | 11/2016 |

OTHER PUBLICATIONS

JPO Notification of Reasons for Refusal for counterpart Application No. JP2018-052350; dated Jan. 29, 2019.
KIPO Office Action counterpart Application No. KR10-2019-0031666; dated Jun. 20, 2019.

\* cited by examiner

FIG. 17
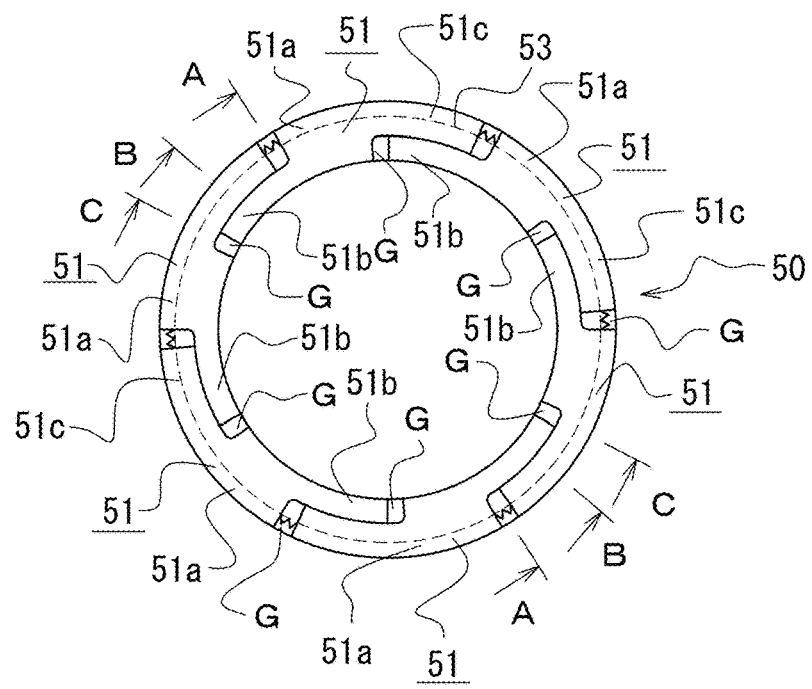
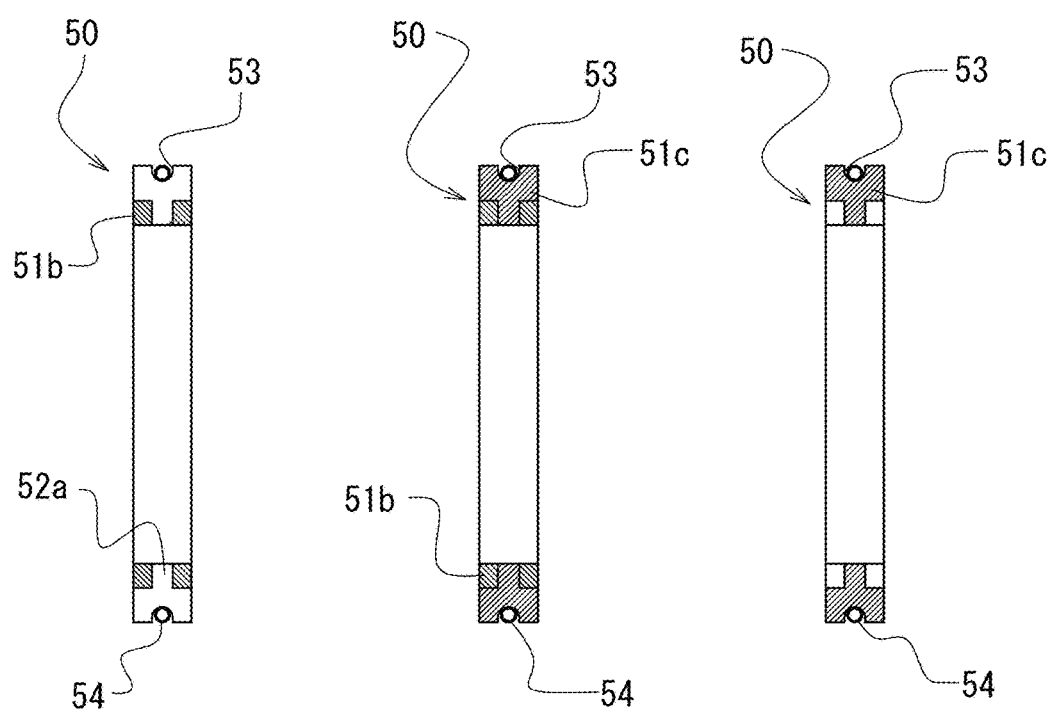
FIG. 18A    FIG. 18B    FIG. 18C

ROD PACKING

CROSS-REFERENCE TO RELATED APPLICATIONS

The present application relates to and claims priority from Japanese patent application No. 2018-052350 filed on Mar. 20, 2018 the content of which is incorporated herein by reference.

BACKGROUND OF THE INVENTION

1. Field of the Invention

The present invention relates to a rod packing for shaft sealing of a gap between, for example, a shaft and a casing. The present invention especially relates to a rod packing for surely sealing a gap between a piston rod and a cylinder in a piston-cylinder mechanism used in a piston pump and so on.

2. Description of Related Art

A piston-cylinder mechanism is a mechanism in which a piston makes reciprocating linear motion in a cylinder, and it absorbs a fluid such as a liquid or air into the cylinder when the piston retreats and discharges the fluid in the cylinder when the piston advances. The discharged fluid has a high pressure because it is in a compressed state. A piston pump is one of devices which discharge a high-pressure fluid using this piston-cylinder mechanism, and is used for a variety of purposes. One of the uses of the piston pump is the pressure-feeding of a fuel for an internal combustion engine. The piston pump is used especially for supplying a liquefied natural gas (LNG) to a diesel engine which uses the LNG fuel as its fuel.

For example, as a power engine of a ship propulsion system, a two-cycle low-speed diesel engine is used because it is capable of low-speed output and capable of directly driving a propeller. In particular, in liquefied natural gas carriers (LNG carriers) or the like, large two-cycle low-speed diesel engines for ships are used. As a fuel for operating two-cycle low-speed diesel engines of this type, a liquid fuel such as a heavy oil is used, but in order to meet the demand for reducing the emission of NOx and SOx in consideration of the environment, the development on the use of alternative fuels has progressed, and the use of liquefied gases, in particular, liquefied natural gas, is being promoted.

In a low-speed diesel engine, a fuel gas is injected directly into a cylinder to achieve high thermal efficiency, and this requires a high gas pressure at an engine inlet. Since LNG is a gaseous fuel at a normal temperature and a normal pressure, LNG is turned into a liquid state at a very low temperature of about minus 160° C. and stored in a vacuum heat-insulated container when transported and stocked. A high-pressure LNG gas suitable as the fuel needs to be produced from the stored LNG liquid, and as a method to produce the high-pressure LNG gas, a high-pressure LGN liquid pump system and a high-pressure gas compressor system are known. Out of these, in the high-pressure LGN liquid pump system, a high-pressure LNG liquid pump which is a piston pump is used as a device for pressure-feeding the LNG liquid from an LNG liquid storage tank to a high-pressure LNG vaporizer. The LNG liquid supplied from the storage tank and pressurized in the high-pressure LNG liquid pump is gasified into low-temperature high-pressure LNG and heated to a gas temperature required at the engine inlet by a heater (see PTL 1).

In a piston pump, a piston rod continuing from a piston penetrates through a rod cover of a cylinder to project in the axial direction. Power is externally given to this projecting portion of the piston rod to cause the reciprocating linear motion of the piston. In the rod cover, around its portion through which the piston rod penetrates, a rod packing is disposed to prevent the fluid in the cylinder from leaking from a gap between the piston rod and the rod cover, while allowing the sliding of the piston rod so that the piston is capable of making the reciprocating linear motion smoothly.

Similarly, the aforesaid type of a high-pressure LNG liquid pump also has a rod packing around a portion where the piston rod slides relative to the cylinder. FIG. 21 and FIG. 22 show a schematic structure of this type of a high-pressure LNG liquid pump 100, wherein FIG. 21 shows a state when the low-pressure LNG liquid is taken in and FIG. 22 shows a state when the high-pressure LNG liquid is discharged.

The high-pressure LNG liquid pump 100, which, for example, has a structure similar to that of the reciprocating pump disclosed in PTL 1, mainly includes a cylinder 101, a piston 102, a cylinder liner 103, a cylinder cover 104, and a valve box 110.

The piston 102 is provided at a leading end of a piston rod 102a penetrating through a base end of the cylinder 101, and a base end of the piston rod 102a projects to the outside of the cylinder 101. This projecting portion of the piston rod 102a is linked to a not-illustrated linear actuator constituted by a hydraulic cylinder unit, an electric cylinder unit, or the like, and the operation of the linear actuator causes the piston rod 102a to make the reciprocating linear motion in the axial direction. It suffices that the linear actuator is a mechanism that causes the reciprocating linear motion of the piston rod 102a, and the linear actuator may be, other than the hydraulic cylinder unit or the electric cylinder unit, another mechanism capable of outputting reciprocating linear motion and transmitting this motion to the piston rod 102a. Further, a linearly reciprocating output shaft of the linear actuator and the piston rod 102a may be integrated.

In the cylinder 101, the cylinder liner 103 is housed, an inner surface of the cylinder liner 103 has the shape of a cylinder, and the piston 102 makes the reciprocating linear motion in this cylinder. A leading end of the cylinder 101 is an open end, and the cylinder cover 104 closes the open end. The valve box 110 is on an inner side of the cylinder cover 104, and an inner end of the cylinder cover 104 is in close contact with the valve box 110.

The valve box 110 has a truncated cone shape, and at its center, a liquid passage 111 is formed along the axial direction. The liquid passage 111 communicates with the inside of the cylinder liner 103 and also connects to a discharge passage 104a formed at the center of the cylinder cover 104, and the discharge passage 104a connects to a discharge port 100b of the high-pressure LNG liquid pump 100. A discharge direction of the discharge port 100b is parallel to the axis of the piston 102. Further, the liquid passage 111 has, at its middle, a large diameter portion 111a where the diameter is enlarged, and a discharge-side valve disc 110a is in the large diameter portion 111a. A peripheral edge of a small-diameter portion on an upper end side of the large diameter portion 111a of the liquid passage 111 is a discharge-side valve seat 110b. When the discharge-side valve disc 110a is seated on the discharge-side valve seat 110b, the liquid passage 111 is closed.

Intake ports 100a are disposed to face a side surface of the truncated cone shape of the valve box 110, and the intake ports 100a communicate with an annular intake passage 112 formed along the side surface of the valve box 110, and above the valve box 110, the intake passage 112 communicates with the inside of the cylinder liner 103. The intake ports 100a extend in a direction intersecting with the axis of the piston 102. On a lower end portion of the cylinder liner 103, an intake-side valve disc 112a is provided so as to be slidable in a direction parallel to the axis of the piston 102, and an upper surface of the valve box 110 forms an intake-side valve seat 112b. When the intake-side valve disc 112a slides to be seated on the intake-side valve seat 112b, the intake passage 112 is closed.

In an outer peripheral surface of the piston 102, seal grooves 102b are formed along the circumferential direction, and in the seal grooves 102b, seal rings (not illustrated) are fitted to seal a gap between the piston 102 and the cylinder liner 103. Further, at a portion of the cylinder 101 where the piston rod 102a penetrates, which portion is in the end portion of the cylinder 101, a rod packing 105 is installed, and a packing presser 101a is inserted from the end portion of the cylinder 101 to press the rod packing 105.

FIG. 21 shows the high-pressure LNG liquid pump 100 in an intake stroke when the piston 102 retreats in a direction in which it separates from the valve box 110. When the piston 102 retreats, the intake-side valve disc 112a also moves upward so as to separate from the valve box 110. This results in the opening of the intake passage 112 to make the intake ports 100a and the inside of the cylinder liner 103 communicate with each other, so that the LNG liquid is taken into the cylinder liner 103 from the intake ports 100a. Further, when the piston 102 retreats, the discharge-side valve disc 110a disposed in the liquid passage 111 also moves upward similarly to the intake-side valve disc 112a to be seated on the discharge-side valve seat 110b. This results in the closing of the liquid passage 111 to isolate the inside of the cylinder liner 103 and the discharge port 100a from each other.

When the piston 102 retreats up to the highest position, the piston 102 is advanced. When the piston 102 advances, the intake-side valve disc 112a is pressed and moved down to be seated on the intake-side valve seat 112b. This results in the closing of the intake passage 112 to isolate the intake ports 100a and the inside of the cylinder liner 103 from each other. The discharge-side valve disc 110a is also pressed and moved down to separate from the discharge-side valve disc 110a. This results in the opening of the liquid passage 111 to make the discharge port 100b and the inside of the cylinder liner 103 communicate with each other, so that the LNG liquid in the cylinder liner 103 is discharged from the discharge port 100b. The LNG liquid comes to have a high pressure by being compressed by the advancing operation of the piston 102. The high-pressure LNG liquid is pressure-fed to a not-illustrated high-pressure vaporizer to be turned into a fuel gas, which is then supplied to a diesel engine.

During the operation of the above-described high-pressure LNG liquid pump 100, the piston 102 scrubs the inside of the cylinder liner 103 while the gap therebetween is sealed by the seal rings, and the piston rod 102a scrubs the rod packing 105 at the portion of the cylinder 101 where the piston rod 102a penetrates. At the time of the discharge of the LNG liquid, since the inside of the cylinder liner 103 is at a high pressure, the LNG liquid which has come to have a high pressure may seep out from between an outer peripheral surface of the cylinder liner 103 and an inner peripheral surface of the cylinder 101. The LNG liquid may seep out also from between the piston 102 and the cylinder liner 103. The seeped LNG liquid passes between the piston rod 102a and the cylinder 101 at the portion of the cylinder 101 where the piston rod 102a penetrates, to reach the rod packing 105. The rod packing 105 is in close contact with the piston rod 102a to prevent the LNG liquid from leaking out.

FIG. 23 is a schematic view showing an example of an installation state of the conventional rod packings 105. The rod packings 105 are disposed while housed in a packing case 115, and when necessary, tensile coil springs 116 are wound around their outer peripheries to bring inner peripheral surfaces of the rod packings 105 into contact with the piston rod 102a. The rod packings 105 of this type are given a pressure indicated by the arrow P from a high-pressure side H and given a pressure indicated by the arrow Q from a low-pressure side L. Since the pressure P from the high-pressure side H is larger than the pressure Q, the rod packings 105 are pressed against an inner wall surface on the low-pressure side L, of the packing case 115 to prevent the leakage from this inner wall surface. Further, the inner peripheral surfaces of the rod packings 105 receive pressure component force due to a pressure difference between the high-pressure side H and the low-pressure side L to come into contact with an outer peripheral surface of the piston rod 102a, thereby preventing the leakage from between the rod packings 105 and the piston rod 102a. In this case, by receiving diameter-reducing-direction biasing force from the tensile coil springs 116, the rod packings 105 are pressed against the outer peripheral surface of the piston rod 102a to maintain their contact state with the piston rod 102a, and these rod packings 105 prevent the leakage from between the piston rod 102a and themselves.

However, pressing the rod packings 105 with large force involves a problem because the rod packings 105 should not prevent the smooth sliding of the piston rod 102a. Accordingly, the complete prevention of the leakage from between the rod packings 105 and the piston rod 102a is not possible. Moreover, since the piston rod 102a scrubs the inner peripheral surfaces of the rod packings 105, the rod packings 105 abrade. Accordingly, the fitting state of the rod packings 105 and the piston rod 102a changes, and the leakage may newly occur. In particular, in the high-pressure LNG liquid pump 100, since the leaking LNG liquid turns into gas under a normal temperature and a normal pressure, it diffuses into the atmosphere in an instant to contaminate the surrounding environment.

In order to maintain the contact state of a rod packing with a shaft such as the piston rod 102a even when it abrades, a rod packing 118 shown in FIG. 24 is cut in the radial direction to be divided in the circumferential direction and has slits 118a formed between separated cut surfaces. However, since the slits 118a are open also on an inner surface side of the packing case 115, the high-pressure fluid on an outer periphery side of the rod packing 118 not only reaches the shaft through the slits 118a but also flows along the inner surface of the packing case 115 to reach the shaft, and may reach a gap between the packing case 115 and the shaft such as the piston rod 102a to leak out.

An example of a rod packing capable of surely maintaining its close contact state with the shaft such as the piston rod 102a even when abrading is a rod packing 119 which is worked into the shape shown in FIG. 25A and FIG. 25B. The rod packing 119 has: a plurality of outer cut portions 119a each formed in parallel to the tangent direction from an outer peripheral surface up to a radial-direction appropriate position; and a plurality of inner slits 119b which each continue from the outer cut portion 119a and are cut in the radial direction up to an inner peripheral surface and whose cut surfaces are apart from each other.

FIG. 25A shows a state before the abrasion, and FIG. 25B shows a state after the abrasion. In the abraded state, the separated cut surfaces of the inner slits 119*b* approach each other and the tangent-direction positions of the outer cut portions 119*a* shift as shown in FIG. 25B, whereby an abrasion amount is absorbed. Accordingly, the close contact state between the cut surfaces in the outer cut portions 119*a* and the close contact state of the shaft and the rod packing 119 are maintained to prevent the leakage of the fluid.

CITATION LIST

Patent Literature

PTL1: JP 5953395 B

BRIEF SUMMARY OF THE INVENTION

For a shaft such as a piston rod, a material made of metal is used, and for a rod packing, a material made of synthetic resin is used. The thermal expansion coefficient of synthetic resin is ten times or more as high as that of metal. Due to the difference in the thermal expansion coefficient between these, a temperature change, if any, may cause the rod packing to deform differently from the deformation due to the abrasion.

FIG. 26A and FIG. 26B show the rod packing 119 respectively when it expands and when it contracts with respect to the piston rod 102*a* which is the shaft. As shown in FIG. 26A, at the time of the expansion, since the rod packing 119 expands radially outward, a gap g is formed between the rod packing 119 and the piston rod 102*a*, which may cause the fluid to leak from the gap g. As shown in FIG. 26B, at the time of the contraction, the cut portions of the outer cut portions 119*a* and the inner slits 119*b* both become open wider, and the cut portions 119*a* and the cut slits 119*b* greatly widen, which may cause the leakage from the widened portions. In the aforesaid high-pressure LNG liquid pump used in the low-speed diesel engine for ships, a difference between the expansion amount and the contraction amount of the rod packing is large because the ship sails in tropical regions and frigid regions and a difference in the ambient temperature is large, which may disable the sufficient prevention of the leakage of the high-pressure fluid.

It is an object of the present invention to provide a rod packing that minimizes the leakage of a fluid to the outside of a cylinder even when the rod packing deforms due to abrasion and even when the rod packing expands and when it contracts due to a temperature change.

As a technical solution to attain the above object, a rod packing according to an embodiment of the present invention is a resin-made ring-shaped rod packing disposed at a shaft seal part of a shaft made of metal while housed in a packing case, the rod packing including a ring member forming the ring shape, wherein the ring member includes: a plurality of inner incision grooves which are arranged in a circumferential direction in an axial-direction one surface of the ring member and which each extend in a radial direction from an inner peripheral surface side up to an appropriate position and have an appropriate depth; a plurality of outer incision grooves which are arranged in the circumferential direction in the axial-direction one surface of the ring member and which each extend in the radial direction from an outer peripheral surface side up to an appropriate position and have an appropriate depth; and a plurality of inner-to-outer incision grooves which are formed in an axial-direction other surface of the ring member and extend in the radial direction from an inner periphery side up to an outer periphery side and have an appropriate depth.

Preferably, a pair of the inner incision grooves and a pair of the outer incision grooves are alternately arranged, and in each of spaces between the pair of inner incision grooves and between the pair of outer incision grooves, the inner-to-outer incision groove is disposed.

Preferably, the inner-to-outer incision grooves face a high-pressure side.

Further, a rod packing according to another embodiment of the present invention is a resin-made rod packing in a ring shape which is disposed at a shaft seal part of a shaft made of metal while housed in a packing case, the rod packing including a ring member forming the ring shape, wherein the ring member includes: an inner ring; and an outer ring which is fitted to the inner ring, wherein the inner ring includes a plurality of inner ring incision grooves which are arranged in a circumferential direction and which each extend in a radial direction from an inner peripheral surface up to an outer peripheral surface and have an appropriate incision depth, wherein the outer ring includes a plurality of outer ring incision grooves which are arranged in the circumferential direction and which each extend in the radial direction from an inner peripheral surface up to an outer peripheral surface and have an appropriate incision depth, and wherein the ring member includes a rotation stopper which prevents a relative position of the inner ring and the outer ring from shifting.

Preferably, the inner ring incision grooves are formed in axial-direction both surfaces of the inner ring, and the outer ring incision grooves are formed in axial-direction both surfaces of the outer ring.

Preferably, the inner ring incision groove in the axial-direction one surface and the inner ring incision groove in the axial-direction other surface make an inner pair, the outer ring incision groove in the axial-direction one surface and the outer ring incision groove in the axial-direction other surface make an outer pair, and the inner pairs and the outer pairs are both arranged in the circumferential direction at equal intervals, and combinations each composed of the inner pair and the outer pair are also arranged in the circumferential direction at equal intervals.

Preferably, the inner ring incision grooves in the adjacent inner pairs are in line symmetry with respect to the radial direction which is a symmetry axis, and the outer ring incision grooves in the adjacent outer pairs are in line symmetry with respect to the radial direction which is a symmetry axis.

A rod packing according to another embodiment of the present invention is a resin-made rod packing in a ring shape which is disposed at a shaft seal part of a shaft made of metal while housed in a packing case, the rod packing including a ring member forming the ring shape, wherein the ring member includes: an inner ring divided in an axial direction into a high-pressure-side ring and a low-pressure-side ring; and an outer ring fitted to the inner ring, wherein the outer ring is fitted to the inner ring in which the high-pressure-side ring and the low-pressure-side ring are in close contact with each other in the axial direction, and wherein the ring member includes a rotation stopper which prevents a relative position of the inner ring and the outer ring from shifting.

Preferably, the inner ring has inner ring diameter-reducing portions formed along outer edge portions of the high-pressure-side ring and the low-pressure-side ring, the outer ring has outer ring diameter-reducing portions which are formed along edge portions of an inner peripheral surface of the outer ring and which correspond with the inner ring diameter-reducing portions, and the outer ring diameter-reducing portions are fitted to the inner ring diameter-reducing portions.

A rod packing according to another embodiment of the present invention is a resin-made rod packing in a ring shape which is disposed at a shaft seal part of a shaft made of metal while housed in a packing case, the rod packing including: a high-pressure-side ring and a low-pressure-side ring equal in shape which are in close contact with each other in an axial direction to form the ring shape; and a rotation stopper which prevents a relative position of the inner ring and the outer ring from shifting.

Preferably, the rings each have a solid fan-shaped portion and a cutout fan-shaped portion which are formed at opposed positions and whose outer peripheral surfaces are at positions radially more outward than an outer peripheral surface of a main body portion of the ring, an inner peripheral surface of the solid fan-shaped portion overlaps with an inner peripheral surface of the main body portion, on an inner peripheral surface of the cutout fan-shaped portion, a cut portion which is cut in a state of an extension of an outer peripheral surface of the main body portion is formed to separate an inner sliding portion of the main body portion and an outer sliding portion of the cutout fan-shaped portion from each other, and at a position faced by a tip of the inner sliding portion, an inner cutout portion is formed.

A rod packing according to an embodiment of the present invention is a resin-made rod packing in a ring shape which is disposed at a shaft seal part of a shaft made of metal while housed in a packing case, the rod packing including a ring member forming the ring shape, wherein the ring member is composed of segment pieces equal in shape into which the ring member is equally divided in a circumferential direction, wherein the segment pieces each include a main body portion, an inner peripheral projecting piece, and an outer peripheral projecting piece which are integrally formed, the inner peripheral projecting piece being formed on one end side of the main body portion and projecting in the circumferential direction on an inner peripheral side, and the outer peripheral projecting piece being formed on the other end side of the main body portion and projecting in the circumferential direction on an outer peripheral side, wherein an engagement groove extending in the circumferential direction is formed in an outer peripheral surface of each of the inner peripheral projecting pieces, wherein an engagement projection engaged with the engagement groove is formed on an inner peripheral surface of each of the outer peripheral projecting pieces, and wherein the engagement projecting pieces are engaged with the engagement grooves to combine the segment pieces in the circumferential direction.

Preferably, buffer gaps are present between a tip portion of the inner peripheral projecting piece of the segment piece and the main body portion of the adjacent segment piece and between a tip portion of the outer peripheral projecting piece of the segment piece and the main body portion of the adjacent segment piece.

In outer peripheral surfaces of the segment pieces, a biasing member holding groove is formed along the circumferential direction, and a biasing member is disposed in the biasing member holding groove to bias the segment pieces in such a direction as to press the segment pieces against the shaft.

According to the present invention, the rod packing is capable of expanding and contracting in the circumferential direction owing to the width increase and decrease of the inner incision grooves and the outer incision grooves, and thus is capable of maintaining its contact state with the shaft even when expanding or contracting due to a temperature change or when changing in dimension due to abrasion, thereby capable of minimizing the leakage of a fluid. In addition, since the axial-direction sides of the inner incision grooves and the outer incision grooves are closed, the rod packing has no fluid passage through which the high-pressure side and the low-pressure side communicate with each other, which more ensures the prevention of the leakage of the fluid.

Further, when used at a shaft seal part of a piston rod of a piston-cylinder mechanism, the rod packing according to the present invention is capable of minimizing the leakage of a fluid which has a high pressure by being compressed by the operation of the piston-cylinder mechanism, from the shaft seal part. In addition, even when the rod packing is abraded by being scrubbed by the piston rod, its contact state with the piston rod is maintained, which more ensures the prevention of the leakage of the fluid.

Further, the use of the rod packing according to the present invention at a shaft seal part of a piston rod of a high-pressure LNG liquid pump allows the high-pressure LNG liquid pump to be installed in a large two-cycle low-speed diesel engine because the rod packing minimizes the leakage of a fluid even when expanding or contracting due to a temperature change. This is because, even when the ambient temperature changes when the ship sails in a tropical region or a frigid region during its voyage, the rod packing and the piston rod are kept in contact with each other, so that the leakage of the high-pressure LNG liquid is minimized, enabling the smooth voyage of the ship. Moreover, as compared with a case where a heavy oil or the like is used as a fuel of the two-cycle low-speed diesel engine, the emission of NOx and SOx reduces, enabling to attain an environmentally advantageous internal combustion engine.

BRIEF DESCRIPTION THE SEVERAL VIEWS OF THE DRAWINGS

Specific embodiments of the present invention will now be described, by way of example only, with reference to the accompanying drawings in which:

FIG. 17 is a plane view of a rod packing according to a fifth embodiment of the invention;

FIG. 18A is a sectional view of the rod packing shown in FIG. 17 taken along the A-A line in FIG. 17;

FIG. 18B is a sectional view of the rod packing shown in FIG. 17 taken along the B-B line in FIG. 17;

FIG. 18C is a sectional view of the rod packing shown in FIG. 17 taken along the C-C line in FIG. 17;

DETAILED DESCRIPTION OF THE INVENTION

Hereinafter, the rod packing according to the invention will be specifically described based on preferred embodiments shown in the accompanying drawings. FIG. 1 and FIGS. 2A-2C show a first embodiment, FIG. 3 to FIG. 7 a second embodiment, FIG. 8 to FIG. 12 a third embodiment, FIG. 13 to FIG. 16 a fourth embodiment, and FIG. 17 to FIG. 20 a fifth embodiment. These embodiments each shows a rod packing suitably provided at a shaft seal part of a piston rod of a piston-cylinder mechanism, and the rod packing is preferably made of synthetic resin on which the metal piston rod can smoothly move and whose amount of abrasion caused by the scrubbing by the piston rod is small.

First Embodiment

Figure 1:
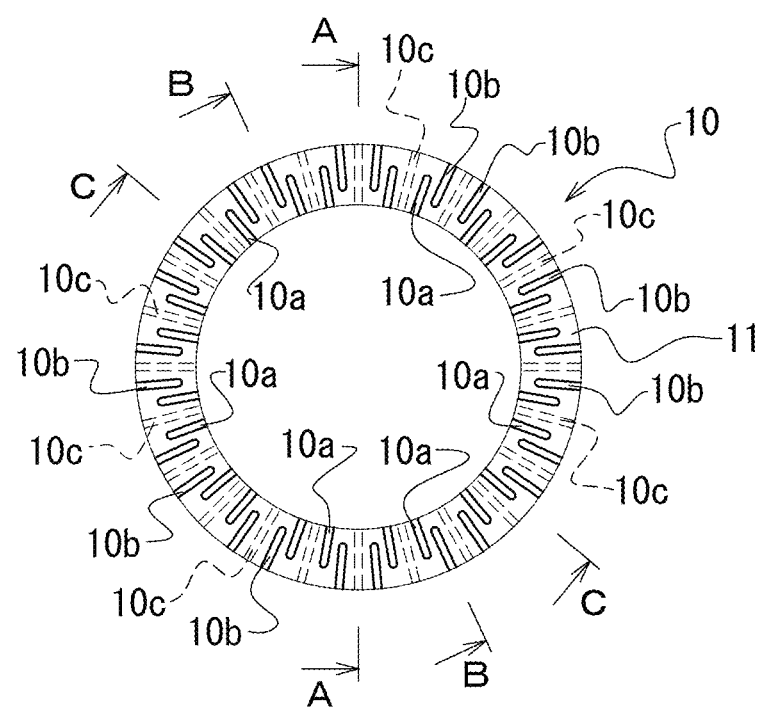
FIG. 1 is a plane view of a rod packing according to a first embodiment of the invention, showing its surface on a low-pressure side.

A rod packing 10 according to a first embodiment will be described with reference to FIG. 1 and FIGS. 2A-2C. FIG. 1 is a plane view of the rod packing 10 seen in the axial direction of a piston rod as a shaft illustrated in FIGS. 2A-2C around which the rod packing 10 is installed. The rod packing 10 is constituted by a ring member 11 formed in a ring shape, and the ring member 11 has inner incision grooves 10*a* and outer incision grooves 10*b* formed in its one surface, and has inner-to-outer incision grooves 10*c* formed in the other surface. The inner incision grooves 10*a* are each formed by incision along the radial direction from an inner peripheral surface of the ring member 11 up to a position on a more outer periphery side than the radial-direction midpoint of the ring member 11 and have an appropriate width and depth. Further, the outer incision grooves 10*b* are each formed by incision along the radial direction from an outer peripheral surface of the ring member 11 up to a position on a more inner periphery side than the radial-direction midpoint of the ring member 11 and have an appropriate width and depth. Further, the inner-to-outer incision grooves 10*c* are formed by incision in the surface opposite to the surface where the inner incision grooves 10*a* and the outer incision grooves 10*b* are formed, from an inner peripheral edge up to an outer peripheral edge and they each have an appropriate width and depth.

The plurality of inner incision grooves 10*a*, outer incision grooves 10*b*, and inner-to-outer incision groove 10*c* are all arranged in the circumferential direction of the ring member 11. In this embodiment, a pair of the adjacent inner incision grooves 10a and a pair of the adjacent outer incision grooves 10b are alternately arranged, and the inner-to-outer incision grooves 10c are disposed alternately at a position sandwiched by the two inner incision grooves 10a and at a position sandwiched by the two outer incision grooves 10b.

Figure 2:
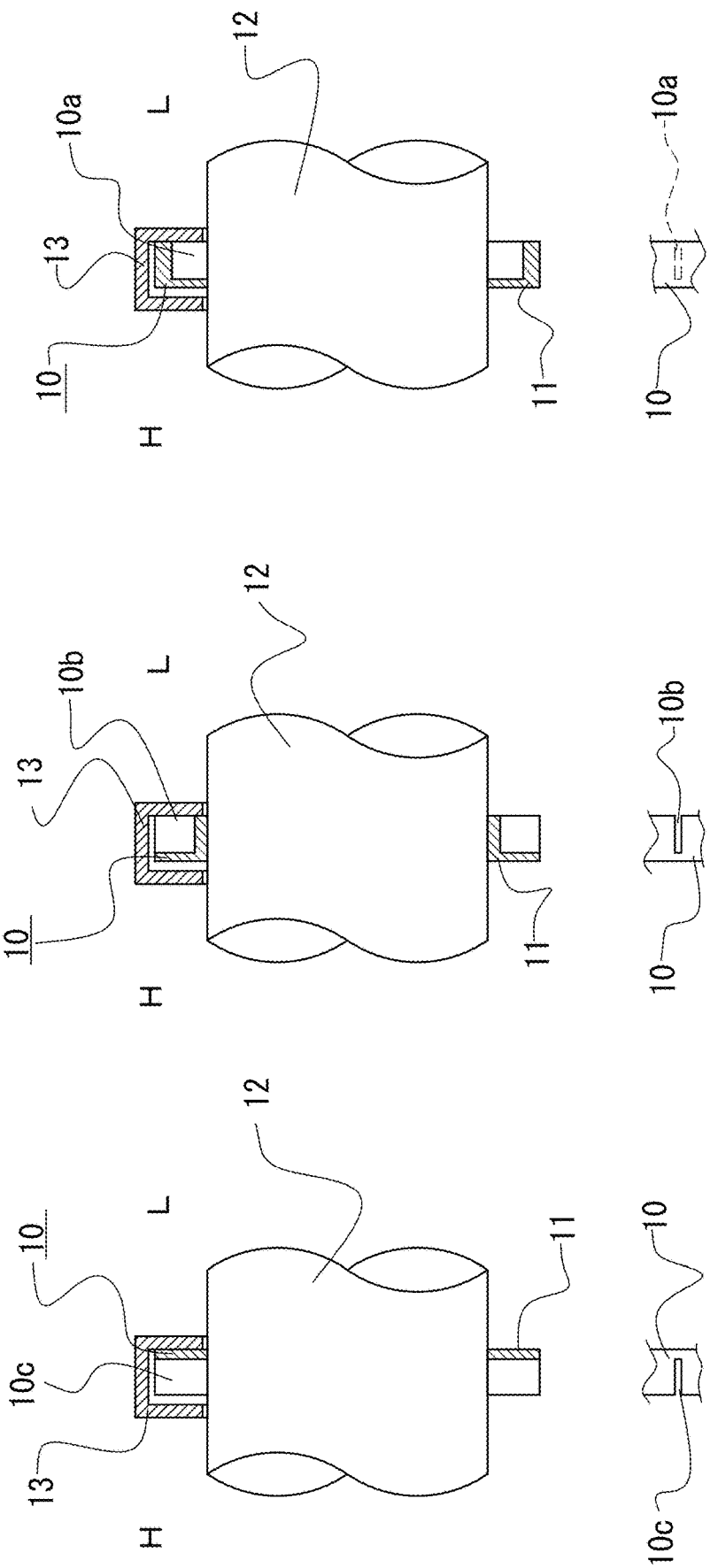
FIG. 2A is a sectional view of the rod packing taken along the A-A line in FIG. 1 in a state where the rod packing is installed around a shaft while housed in a packing case, with outer peripheral surfaces at the cut positions depicted together.
FIG. 2B is a sectional view of the rod packing taken along the B-B line in FIG. 1 in a state where the rod packing is installed around a shaft while housed in a packing case, with outer peripheral surfaces at the cut positions depicted together.
FIG. 2C is a sectional view of the rod packing taken along the C-C line in FIG. 1 in a state where the rod packing is installed around a shaft while housed in a packing case, with outer peripheral surfaces at the cut positions depicted together.

FIGS. 2A-2C show a state where the rod packing 10 is installed at a shaft seal part of a piston rod 12. The rod packing 10 is installed around the piston rod 12 while housed in a packing case 13 which has a ring shape with a substantially U-shaped section and which is disposed with an open portion of the U-shape facing an outer peripheral surface of the piston rod 12. As shown in FIGS. 2A-2C, one side of the rod packing 10 is a high-pressure side H, and the other side is a low-pressure side L. A fluid tries to flow to the low-pressure side L to try to leak when receiving a pressure of the high-pressure side H. The rod packing 10 is disposed with opening sides of the inner-to-outer incision grooves 10c directed to the high-pressure side H. Consequently, openings of the inner incision grooves 10a and the outer incision grooves 10b are directed to the low-pressure side L.

A surface on the low-pressure side L, of the rod packing 10 is pressed against an inner surface on the low-pressure side L, of the U-shape of the packing case 13 due to a pressure difference between the high-pressure side H and the low-pressure side L, so that the rod packing 10 comes into close contact with the packing case 13. Further, when the temperature changes, the inner incision grooves 10a, the outer incision grooves 10b, and the inner-to-outer incision grooves 10c change in width to adapt to the circumferential-direction expansion/contraction. Accordingly, even when the temperature changes, the contact state with the piston rod 12 is maintained. Further, even when the rod packing 10 is scrubbed to abrade due to the reciprocating linear motion of the piston rod 12, the rod packing 10 changes in the circumferential length according to the abrasion, owing to the width change of the inner incision grooves 10a, the outer incision grooves 10b, and the inner-to-outer incision grooves 10c, so that the contact state with the piston rod 12 is maintained.

Further, a biasing member (not shown in drawings) which biases the ring member 11 so that an inner peripheral surface of the ring member 11 comes into contact with an outer peripheral surface of the piston rod 12 may be provided on an outer peripheral surface of the ring member 11. The biasing member more ensures that the contact state of the rod packing 10 with the piston rod 12 is maintained even when the rod packing 10 abrades. As the biasing member, a tensile coil spring is usable. Further, a biasing member holding groove which holds the biasing member is preferably provided along the circumferential direction in the outer peripheral surface of the ring member 11.

Second Embodiment

Figure 6A:
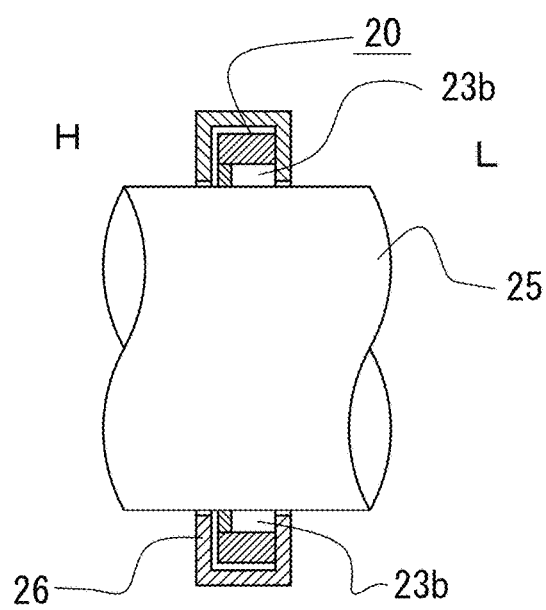
FIG. 6A is a sectional view of the rod packing shown in FIG. 3 along the A-A line in a state where the rod packing is installed around a shaft while housed in a packing case.
Figure 6B:
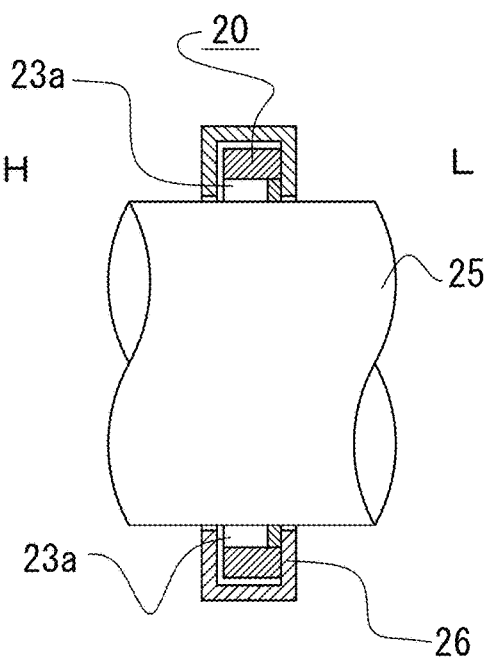
FIG. 6B is a sectional view of the rod packing shown in FIG. 3 along the B-B line in a state where the rod packing is installed around the shaft while housed in the packing case.
Figure 6C:
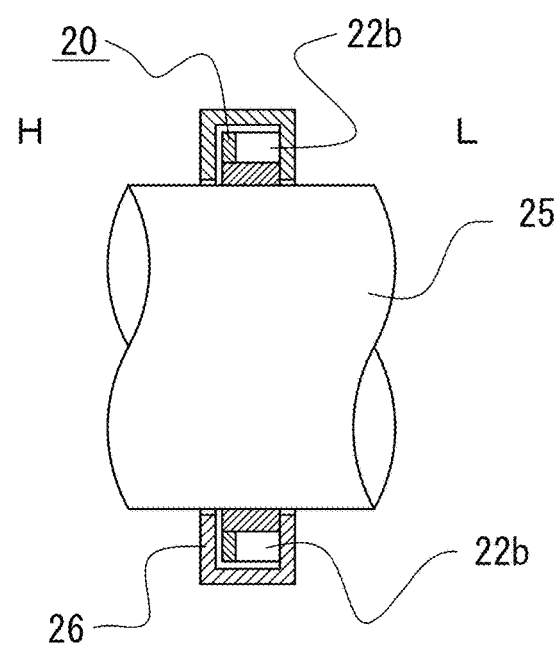
FIG. 6C is a sectional view of the rod packing shown in FIG. 3 along the C-C line in a state where the rod packing is installed around the shaft while housed in the packing case.
Figure 6D:
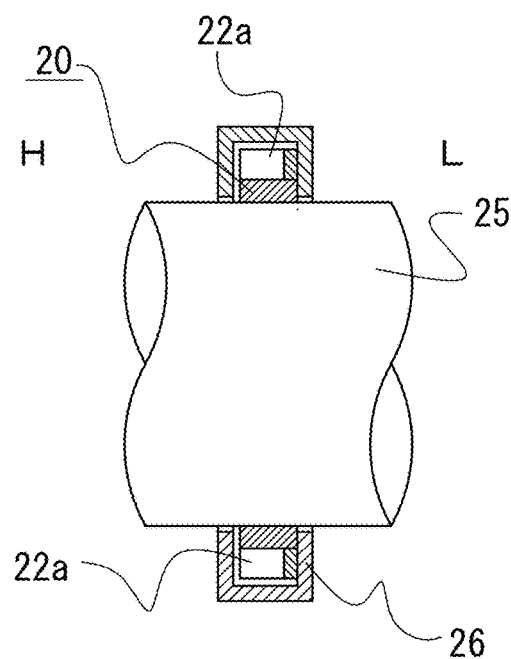
FIG. 6D is a sectional view of the rod packing shown in FIG. 3 along the D-D line in a state where the rod packing is installed around the shaft while housed in the packing case.
Figure 7:
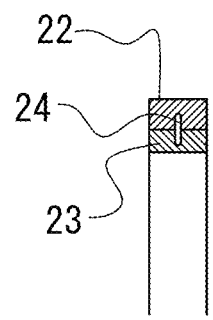
FIG. 7 is a sectional view showing an example of a rotation stopper between the outer ring and the inner ring of the rod packing illustrated in FIG. 3, and is a sectional view taken along the E-E line in FIG. 3.

FIG. 3 to FIG. 7 show a rod packing 20 according to a second embodiment. A ring member 21 of the rod packing 20 according to the second embodiment includes an outer ring 22 and an inner ring 23, and is formed with the outer ring 22 fitted to the inner ring 23. Further, as shown in FIG. 7 which is a sectional view taken along the E-E line in FIG. 3, a lock pin 24 which is a rotation stopper is provided from the outer ring 22 to the inner ring 23 to prevent the relative position of the outer ring 22 and the inner ring 23 from shifting.

Figure 4A:
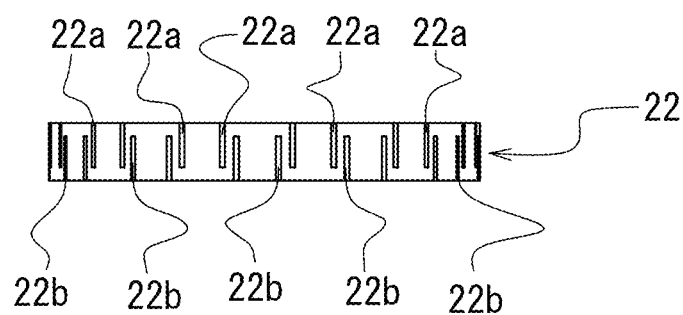
FIG. 4A is a front view of an outer ring of the rod packing illustrated in FIG. 3.
Figure 4B:
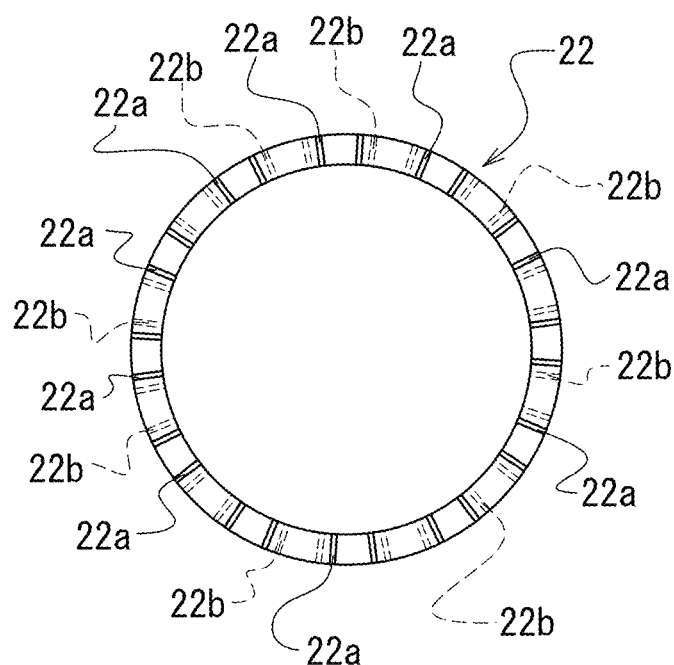
FIG. 4B is a plane view of the outer ring of the rod packing illustrated in FIG. 3.
Figure 5A:
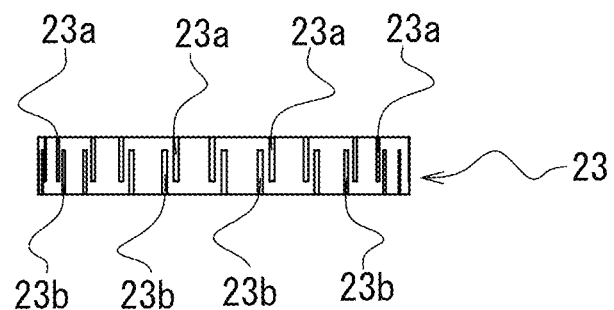
FIG. 5A is a front view of an inner ring of the rod packing illustrated in FIG. 3.
Figure 5B:
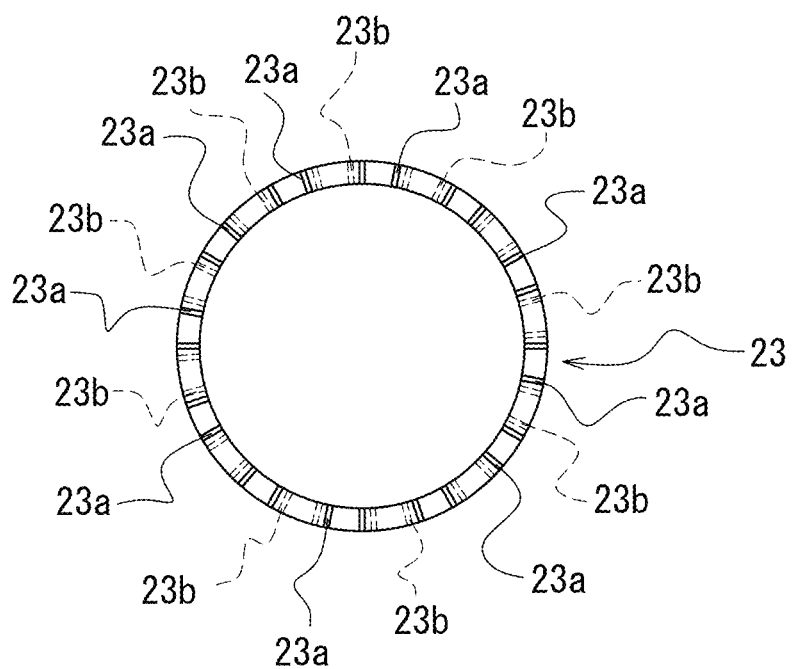
FIG. 5B is a plane view of the inner ring of the rod packing illustrated in FIG. 3.

FIGS. 4a and 4B show the outer ring 22, FIG. 4(A) being a front view and FIG. 4(B) being a plane view. Incision grooves 22a, 22b as outer ring incision grooves incised with an appropriate width and depth are formed along the radial direction respectively in axial-direction both surfaces of the outer ring 22, to make an inner periphery side and an outer periphery side communicate with each other. Note that these incision grooves 22a, 22b will be referred to as front incision grooves 22a and rear incision grooves 22b for convenience' sake. As shown in FIG. 4B, the central angle between the front incision groove 22a and the rear incision groove 22b closest to this front incision groove 22a is smaller than any of the central angles between the adjacent front incision grooves 22a and the central angles between the adjacent rear incision grooves 22b. Further, as shown in FIG. 4A, pairs each composed of the front incision groove 22a and the rear incision groove 22b closest to this front incision groove 22a are arranged in the circumferential direction at substantially equal intervals, with the order of these front incision groove 22a and rear incision groove 22b inverted alternately. As shown in FIG. 5, incision grooves 23a, 23b as inner ring incision grooves incised with an appropriate width and depth are formed along the radial direction respectively in axial-direction both surfaces of the inner ring 23 as in the outer ring 22, to make an inner periphery side and an outer periphery side communicate with each other. Note that these incision grooves 23a, 23b will be referred to as front incision grooves 23a and rear incision grooves 23b for convenience' sake. As shown in FIG. 5B, the central angle between the front incision groove 23a and the rear incision groove 23b closest to this front incision groove 23a is smaller than any of the central angles between the adjacent front incision grooves 23a and the central angles between the adjacent rear incision groove 23b. Further, as shown in FIG. 5B, pairs each composed of the front incision groove 23a and the rear incision groove 23b closest to this front incision groove 23a are arranged in the circumferential direction at substantially equal intervals, with the order of these front incision groove 22a and rear incision groove 22b inverted alternately.

Figure 3:
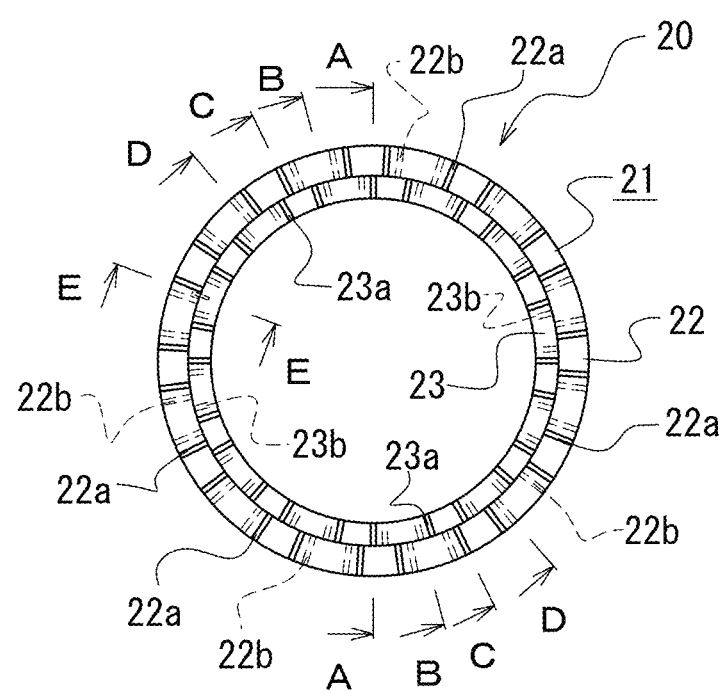
FIG. 3 is a plane view of a rod packing according to a second embodiment of the invention, illustrating its surface on a high-pressure side.

FIGS. 6A-6D show a state where the rod packing 20 is installed around a piston rod 25 slidable in the axial direction, FIG. 6A being a sectional view taken along the A-A line in FIG. 3, FIG. 6B along the B-B line in FIG. 3, FIG. 6C along the C-C line in FIG. 3, and FIG. 6D along the D-D line in FIG. 3. As shown in FIG. 3 and FIGS. 6A-6D, the outer ring 22 and the inner ring 23 are combined while positionally deviated from each other so that the incision grooves 22a, 22b formed in the outer ring 22 do not communicate with the incision grooves 23a, 23b formed in the inner ring 23, and the lock pin 24 prevents the positional displacement of the outer ring 22 and the inner ring 23.

As shown in FIG. 6A and FIG. 6B, the inner ring 23 is disposed with open sides of the incision grooves 23a, 23b adjacent in the circumferential direction directed to the high-pressure side H and the low-pressure side L respectively. In the outer ring 22, at positions facing the incision grooves 23a, 23b, the incision grooves 22a, 22b are not formed, and outer periphery sides of the incision grooves 23a, 23b are closed with the outer ring 22. Further, as shown in FIG. 6C and FIG. 6D, the outer ring 22 is disposed with open sides of the incision grooves 22a, 22b adjacent in the circumferential direction directed to the high-pressure side H and the low-pressure side L respectively. In the inner ring 23, at positions facing the incision grooves 22a, 22b, the incision grooves 23a, 23b are not formed, and inner periphery sides of the incision grooves 22a, 22b are closed with the inner ring 23.

As shown in FIGS. 6A-6D, the rod packing 20 in which the outer ring 22 and the inner ring 23 are combined with the latter fitted to the former is installed around a piston rod 25 while housed in a packing case 26 which has a ring shape with a substantially U-shaped section and which is disposed with an open portion of the U-shape facing an outer peripheral surface of the piston rod 25.

The rod packing 20 is pressed against an inner surface on the low-pressure side L, of the packing case 26 due to a pressure difference between the high-pressure side H and the low-pressure side L, so that the rod packing 20 comes into close contact with the packing case 26. Further, when the temperature changes, the incision grooves 22a, 22b, 23a, 23b change in width to adapt to the circumferential-direction expansion/contraction. Accordingly, even when the temperature changes, the contact state with the piston rod 25 is maintained. Further, even when the rod packing 20 is scrubbed to abrade due to the reciprocating linear motion of the piston rod 25, the circumferential-direction length changes according to the abrasion owing to the width change of the incision grooves 22a, 22b, 23a, 23b, so that the contact state with the piston rod 25 is maintained.

Further, in the structure divided in the radial direction into the outer ring 22 and the inner ring 23, second moments of area of their sections taken along a plane including the axis are smaller than in the rod packing 10 illustrated in the first embodiment in which the ring member 11 is not divided in the radial direction, which makes it easy for the outer ring 22 and the inner ring 23 to deform in the radial direction, so that only small force is required to maintain the contact state with the piston rod 25.

Further, a not-illustrate biasing member which biases the outer ring 22 so as to press the outer ring 22 against the inner ring 23 may be provided on an outer peripheral surface of the outer ring 22. Owing to the biasing member, the pressed inner ring 23 is pressed against an outer peripheral surface of the piston rod 25, which more ensures that the contact state with the piston rod 25 is maintained even when the inner ring 23 of the rod packing 20 abrades. As the biasing member, a tensile coil spring is usable. Further, a biasing member holding groove which holds the biasing member is preferably provided along the circumferential direction in the outer peripheral surface of the outer ring 22.

Third Embodiment

A third embodiment of the rod packing according to the invention will be described with reference to FIG. 8 to FIG. 12.

Figure 8:
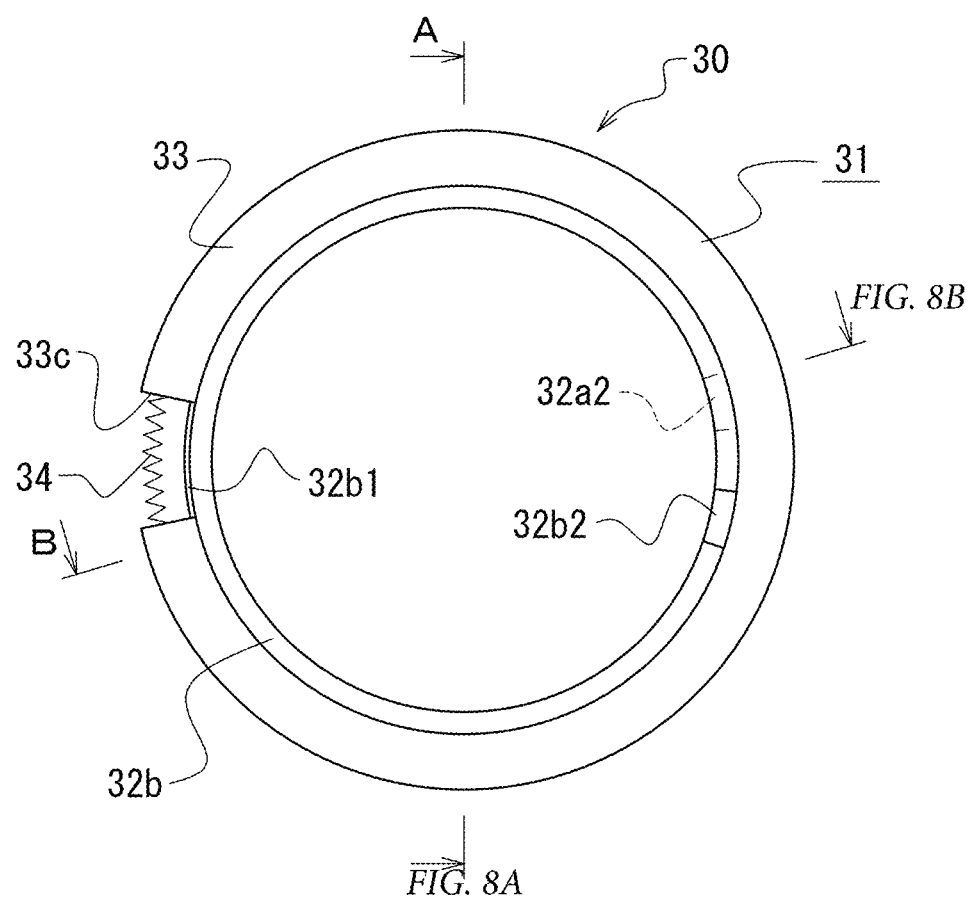
FIG. 8 is a plane view of a rod packing according to a third embodiment of the invention.
Figure 9:
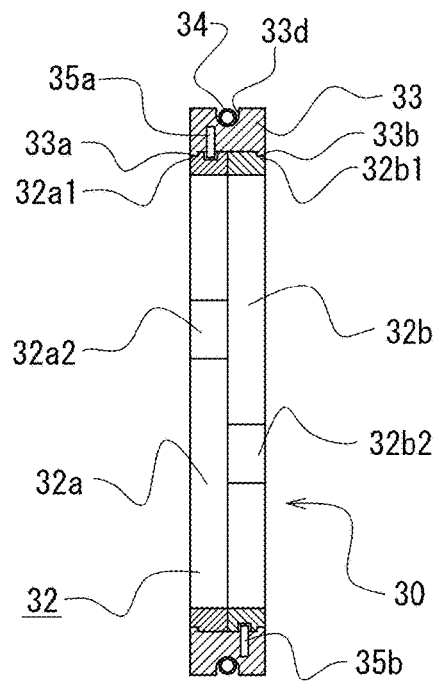
FIG. 9 is a sectional view of the rod packing illustrated in FIG. 8, taken along the A-A line in FIG. 8.
Figure 10:
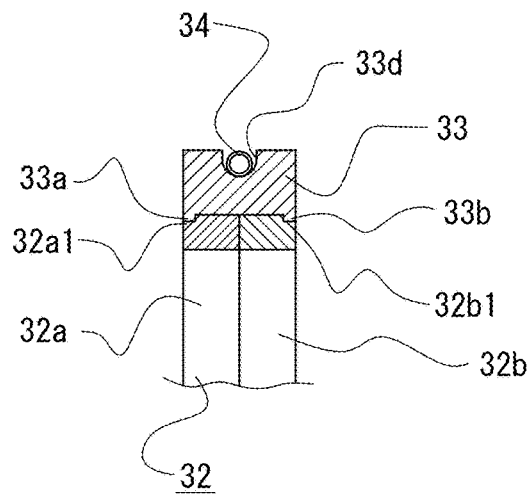
FIG. 10 is an enlarged sectional view of a portion without the rotation stopper in the rod packing illustrated in FIG. 8 taken along a plane including the axis.
Figure 11:
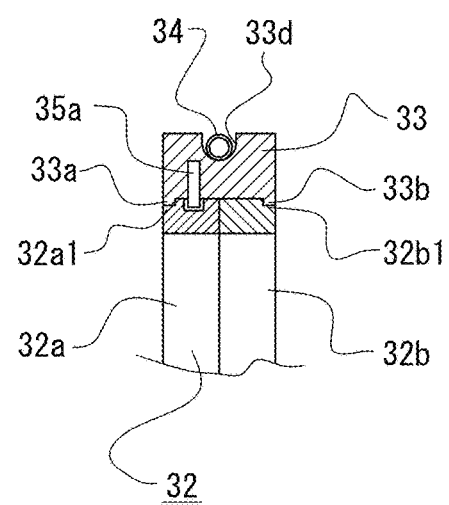
FIG. 11 is an enlarged view of a part of the sectional view shown in FIG. 9.
Figure 12:
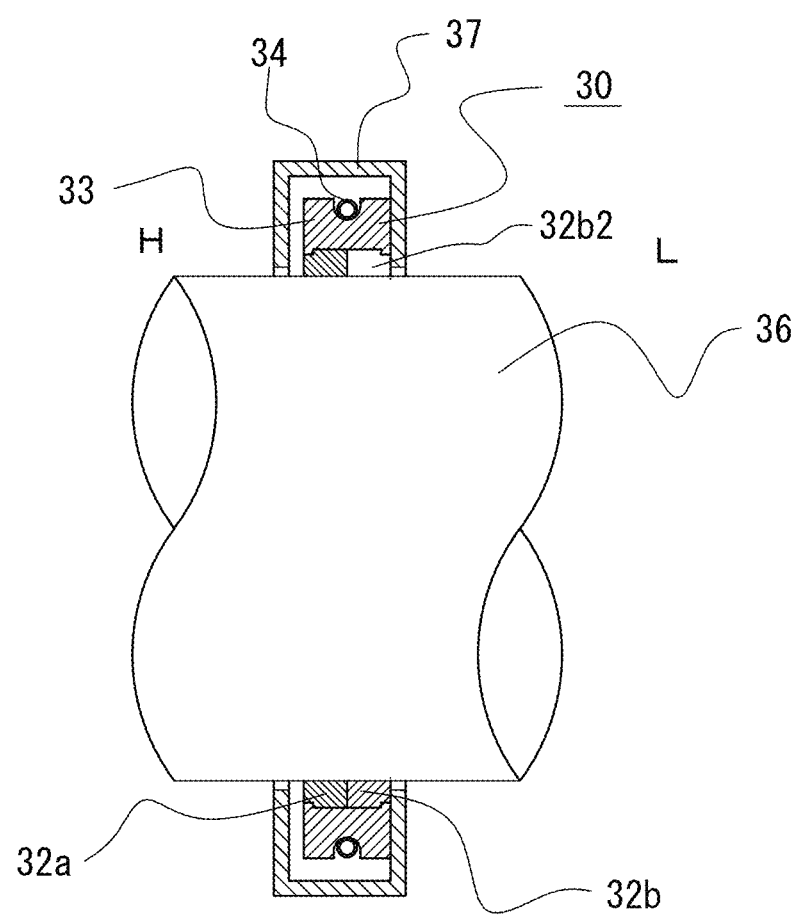
FIG. 12 is a sectional view illustrating a state where the rod packing illustrated in FIG. 8 is installed around a shaft while housed in a packing case, and illustrating the rod packing taken along the B-B line in FIG. 8.

The third embodiment of the rod packing according to the invention will be described with reference to FIG. 8 to FIG. 12. As shown in FIG. 8 and FIG. 9, a ring member 31 of the rod packing 30 is formed of a combination of an inner ring 32 and an outer ring 33. The inner ring 32 is composed of two first inner ring 32a and second inner ring 32b which are in close contact with each other in the axial direction. One of the first inner ring 32a and the second inner ring 32b is a high-pressure-side ring and the other is a low-pressure-side ring. In this embodiment, as illustrated in FIG. 12, the first inner ring 32a is the high-pressure-side ring. In axial-direction outer edges of outer peripheral surfaces of the first inner ring 32a and the second inner ring 32b, inner ring diameter-reducing portions 32a1, 32b1 are respectively formed up to an appropriate position along the axial direction. Outer ring diameter-reducing portions 33a, 33b substantially equal in the axial-direction length to the inner ring diameter-reducing portions 32a1, 32b1 are formed along axial-direction both edges of an inner peripheral surface of the outer ring 33 to be engaged with the inner ring diameter-reducing portions 32a1, 32b1.

In the first inner ring 32a and the second inner ring 32b of the inner ring 32, a first cut portion 32a2 and a second cut portion 32b2 are respectively formed with an appropriate central angle, and the first inner ring 32a and the second inner ring 32b are divided in the circumferential direction by the cut portions 32a2, 32b2.

As shown in FIG. 8, a cut portion 33c with an appropriate central angle is formed in part of the outer ring 33 to divide the outer ring 33 in the circumferential direction. In an outer peripheral surface of the outer ring 33, a biasing member holding groove 33d having a semicircular bottom is formed along the circumferential direction, and a tensile coil spring 34 which is a biasing member is disposed in the biasing member holding groove 33d.

As shown in FIG. 8 and FIG. 9, the inner ring 32 and the outer ring 33 are combined in such a positional relation that the first cut portion 32a2 and the second cut portion 32b2 formed in the former do not communicate with the cut portion 33c formed in the latter. As shown in FIG. 9 and FIG. 11, in order to maintain this positional relation, a lock pin 35a which is a rotation stopper for linking the outer ring 33 and the first inner ring 32a, and a lock pin 35b which is a rotation stopper for linking the outer ring 33 and the second inner ring 32b are disposed.

As shown in FIG. 12, the rod packing 30, in which the first inner ring 32a, the second inner ring 32b, and the outer ring 33 are combined, is installed around a piston rod 36 slidable in the axial direction. In the rod packing 30, the second cut portion 32b2 formed in the second inner ring 32b is directed to the low-pressure side L, and the first cut portion 32a2 is directed to the high-pressure side H. Further, the rod packing 30 is installed around the piston rod 36 while housed in a packing case 37 which has a ring shape with a substantially U-shaped section and which is disposed with an open portion of the U-shape facing an outer peripheral surface of the piston rod 36.

Due to a pressure difference between the high-pressure side H and the low-pressure side L, the rod packing 30 is pressed against an inner surface on the low-pressure side L, of the packing case 37 to come into close contact with the packing case 37. Further, an outer periphery side of the first cut portion 32a2 whose opening is directed to the high-pressure side H is closed by the outer ring 33, and its low-pressure side L is closed by an axial-direction surface of the second inner ring 32b, so that the high-pressure side H and the low-pressure side L are isolated from each other, achieving the sealing.

Further, when the temperature changes, the first inner ring 32a, the second inner ring 32b, and the outer ring 33 expand/contract in the circumferential direction owing to the first cut portion 32a2, the second cut portion 32b2, and the cut portion 33c, to adapt to the temperature change. Consequently, even when the temperature changes, the contact state between an inner peripheral surface of the inner ring 32 and the piston rod 36 is maintained. Further, even if the inner peripheral surface of the inner ring 32 is scrubbed to abrade due to the reciprocating linear motion of the piston rod 36, the contact state with the piston rod 36 is maintained because the first inner ring 32a and the second inner ring 32b contract while cut surfaces of the first cut portion 32a2 and the second cut portion 32b2 approach each other. Further, following the contraction of the first inner ring 32a and the second inner ring 32b, the outer ring 33 contracts while its cut surfaces facing the cut portion 33c approach each other, to be kept linked with the inner ring 32.

Further, receiving the restoring force of the tensile coil spring 34, the outer ring 33 tries to contract to reduce in diameter such that the cut surfaces of the cut portion 33c approach each other, and accordingly the inner ring 32 is biased such that the cut surfaces of the first cut portion 32a2 and the second cut portion 32b2 approach each other. Accordingly, the inner ring 32 tries to reduce in diameter so as to contract in the circumferential direction, thereby maintaining its contact state with the outer peripheral surface of the piston rod 36.

In addition, since the ring member 31 of the rod packing 30 is divided in the radial direction into the inner ring 32 and the outer ring 33, second moments of area of their sections taken along a plane including the axis are smaller than in the structure not divided in the radial direction, which makes it easy for the inner ring 32 and the outer ring 33 to deform in the radial direction. Accordingly, only small force is required to maintain the contact state with the piston rod 36.

Fourth Embodiment

A fourth embodiment of the rod packing according to the invention will be described with reference to FIG. 13 to FIG. 16.

Figure 13:
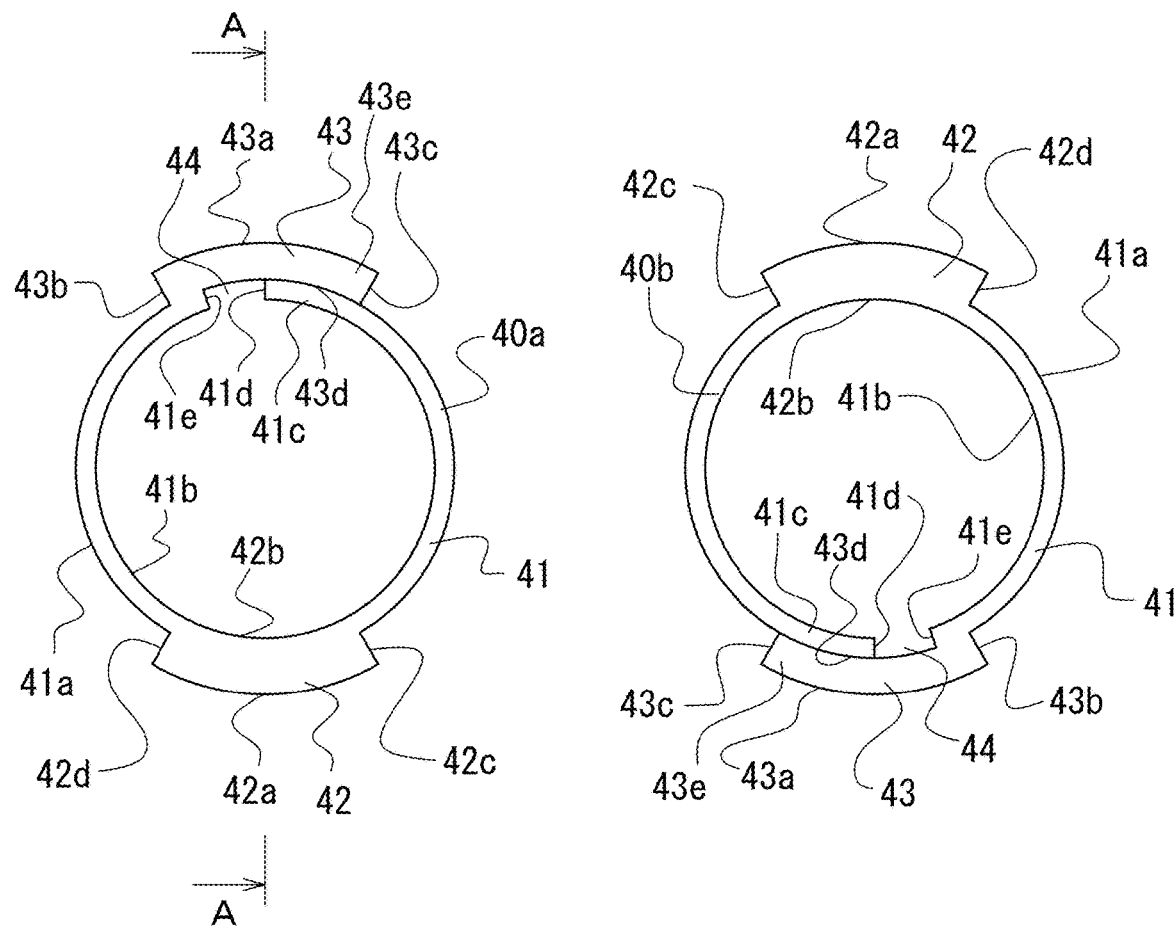
FIG. 13 is a plane view of a rod packing according to a fourth embodiment of the invention, showing that two rings in the same shape forming a ring member are combined with a 180° deviation.
Figure 14:
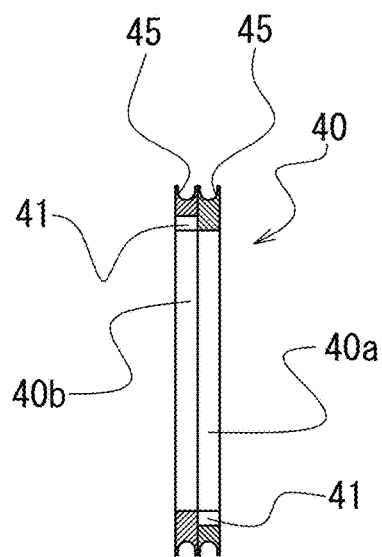
FIG. 14 is a sectional view of the rod packing shown in FIG. 13 taken along the A-A line in FIG. 13, showing a state where the two rings are combined with their end surfaces in contact with each other.

As shown in FIG. 14, the rod packing 40 according to the fourth embodiment is composed of a high-pressure-side ring 40a and a low-pressure-side ring 40b which are in close contact with each other in the axial direction. The high-pressure-side ring 40a and the low-pressure-side ring 40b have the same shape as shown in FIG. 13, and they each are usable as a ring on whichever side.

In FIG. 13, the high-pressure-side ring 40a and the low-pressure-side ring 40b are depicted side by side, but they have the same shape, and when used, they are brought into close contact with each other while deviated from each other by about 180°, that is, the two rings 40a, 40b are stacked in close contact in the positional relation shown in FIG. 13. Further, the distinction between the high-pressure-side ring 40a and the low-pressure-side ring 40b is for convenience' sake, and the shape and structure of the rings 40a, 40b will be hereinafter described using the same reference signs for both.

The rings 40a, 40b each have a solid fan-shaped portion 42 and a cutout fan-shaped portion 43 which are formed at opposed positions along parts of an outer periphery of a ring-shaped main body portion 41. Outer peripheral surfaces 42a, 43a of these fan-shaped portions 42, 43 are located at positions radially more outward than an outer peripheral surface 41a of the main body portion 41. The solid fan-shaped portion 42 has an inner peripheral surface 42b at a position overlapping with an inner peripheral surface 41b of the main body portion 41, and its circumferential length is restricted by a pair of side surfaces 42c, 42d which make an appropriate center angle.

The cutout fan-shaped portion 43 has an outer peripheral surface 43a and side surfaces 43b, 43c which are substantially the same as those of the solid fan-shaped portion 42. A cut portion 43d which is cut in a state of an extension of the outer peripheral surface 41a of the main body portion 41 is formed with an appropriate circumferential-direction length from the side surface 43c. The cut portion 43d separates an inner sliding portion 41c continuing from the main body portion 41 and an outer sliding portion 43e formed in part of the cutout fan-shaped portion 43 from each other. Between an end surface 41d of the inner sliding portion 41c and an end surface 41e continuing from the inner peripheral surface 41b of the main body portion 41, an inner cutout portion 44 is formed. The inner cutout portion 44 is formed by cutting off a tip portion of the inner sliding portion 41c up to the end surface 41d, and accordingly, when, for example, the end surface 41d and the end surface 41e are overlapped, the main body portion 41 becomes flat.

Figure 15:
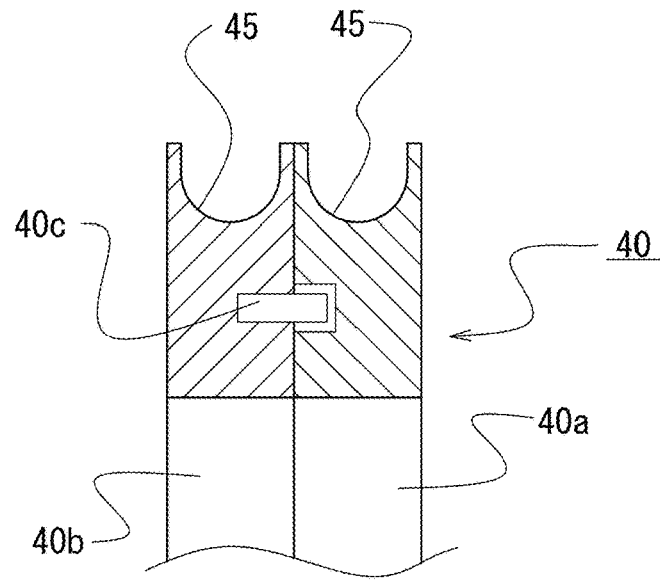
FIG. 15 is a partial enlarged sectional view of the rod packing shown in FIG. 13, showing an example of a rotation stopper.
Figure 16:
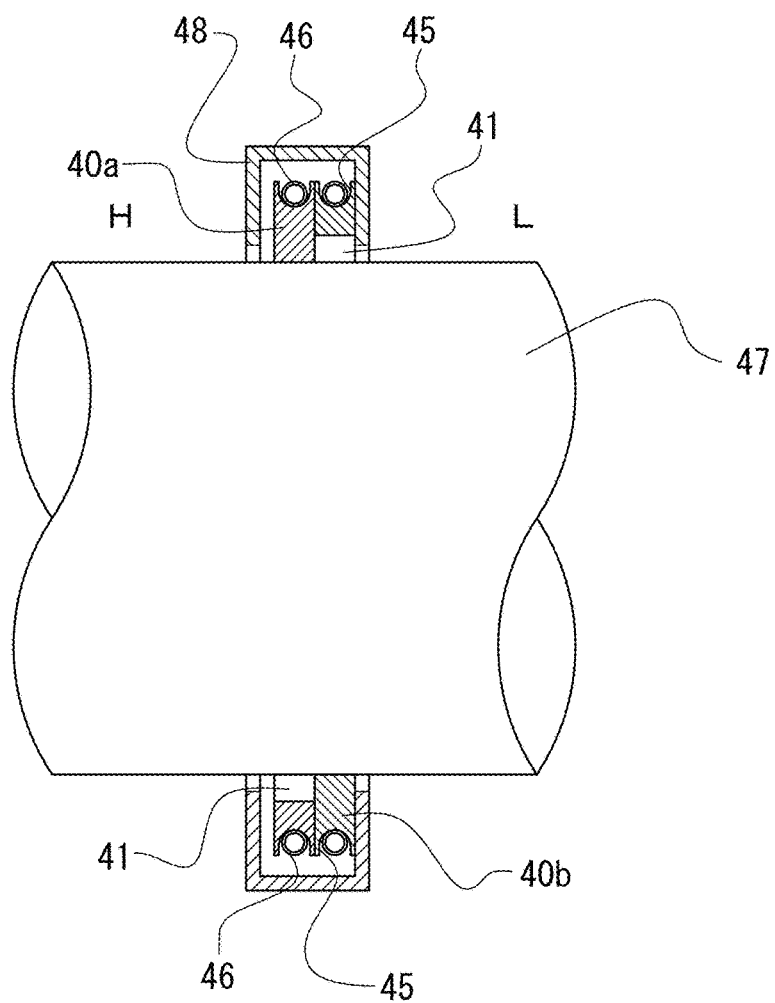
FIG. 16 is a sectional view showing a state where the rod packing assembled as shown in FIG. 14 is installed around a shaft while housed in a packing case.

In an outer peripheral surface of each of the rings 40a, 40b, a biasing member holding groove 45 having a semi-circular bottom may be formed along the circumferential direction. As shown in FIG. 16, tensile coil springs 46 which are biasing members are disposed in the biasing member holding grooves 45. Further, as shown in FIG. 15, in order to prevent the relative position of the rings 40a, 40b from shifting, a lock pin 40c which is a rotation stopper is disposed at an appropriate position.

The high-pressure-side ring 40a and the low-pressure-side ring 40b are stacked in the positional relation shown in FIG. 13, that is, while being turned from each other by about 180°. In this state, they are installed around a piston rod 47 as shown in FIG. 16. The rod packing 40 is installed around the piston rod 47 while housed in a packing case 48 which has a ring shape with a substantially U-shaped section and which is disposed with an open portion of the U-shape facing an outer peripheral surface of the piston rod 47.

Due to a pressure difference between the high-pressure side H and the low-pressure side L, the rod packing 40 is pressed against an inner surface on the low-pressure side L, of the packing case 48 to be in close contact with the packing case 48. Further, since the solid fan-shaped portions 42 and the cutout fan-shaped portions 43 overlap each other when the high-pressure-side ring 40a and the low-pressure-side ring 40b are stacked, the inner cutout portions 44 are closed by the solid fan-shaped portions 42. Accordingly, the rod packing 40 has no fluid passage through which the high-pressure side H and the low-pressure side L communicate with each other, and the H-pressure side and the low-pressure side are isolated from each other, achieving the sealing.

Further, when the temperature changes or when the rod packing 40 is scrubbed to abrade due to the reciprocating linear motion of the piston rod 47, the inner sliding portions 41c and the outer sliding portions 43e move in the circumferential direction relative to each other, so that a change in the circumferential length due to the temperature change or the abrasion is absorbed and the contact state of the rod packing 40 and the piston rod 47 is maintained.

Especially in the structure provided with the tensile coil springs 46, in spite of the possibility that a gap may be formed between an inner peripheral surface of the rod packing 40 and an outer peripheral surface of the piston rod 47 due to the abrasion, the fan-shaped portions 42, 43 are pressed by receiving the restoration force of the tensile coil springs 46, and the inner sliding portions 41c move relative to the outer sliding portions 43e by a distance corresponding to an abrasion amount, so that the contact state of the rod packing 40 and the piston rod 47 is maintained. At this time, since the fan-shaped portions 42, 43 each have a shape radially wider than the main body portions 41, the radial-direction length of the main body portions 41 is smaller than the radial-direction length of the fan-shaped portions 42, 43, so that sections of the main body portions 41 taken along a plane including the axis have a small second moment of area, which makes it easy for the rings 40a, 40b to deform in the radial direction. Accordingly, only small force is required to maintain the contact state with the piston rod 47.

Having the structure in which the two rings 40a, 40b, namely, the high-pressure-side ring 40a and the low-pressure-side ring 40b are in close contact with each other in the axial direction, the rod packing 40 according to this embodiment can be assembled with a simpler work and is easier to handle than a rod packing divided in the radial direction. Further, since the high-pressure-side ring 40a and the low-pressure-side ring 40b have the same shape and structure, molding is easy.

Fifth Embodiment

A fifth embodiment of the rod packing according to the invention will be described with reference to FIG. 17 to FIG. 20.

As shown in FIG. 17, the rod packing 50 according to the fifth embodiment is composed of a plurality of connected segment pieces 51 with the same shape and structure into which the rod packing 50 is divided in the circumferential direction. Though this embodiment illustrates the case where the rod packing 50 is equally divided in the circumferential direction into six parts, but the number of division is not limited to six.

Figure 19:
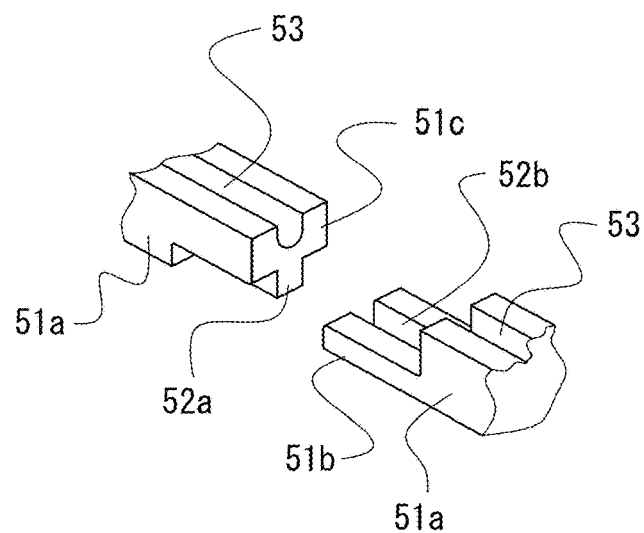
FIG. 19 is an explanatory perspective view of a combination structure of segment pieces forming the rod packing shown in FIG. 17.

The segment pieces 51 are each composed of a main body portion 51a, an inner peripheral projecting piece 51c, an outer peripheral projecting piece 51c which are integrated. FIG. 19 shows the structure of a connection part for connecting the segment pieces 51 with each other. Radial-direction end surfaces of the main body portions 51a respectively form an inner peripheral surface and an outer peripheral surface of the rod packing 50. The inner peripheral projecting pieces 51b each project in the circumferential direction from an inner periphery side of one circumferential-direction end of the main body portion 51a. Further, the outer peripheral projecting pieces 51c each project in the circumferential direction from an outer periphery side of the other end portion. Along the axial-direction middle portion of an inner periphery-side surface of each of the outer peripheral projecting pieces 51c, an engagement projection 52a in a projecting shape is formed. Along the axial-direction middle portion of an outer periphery-side surface of each of the inner peripheral projecting pieces 51b, an engagement groove 52b in an indented shape engaged with the engagement projection 52a is formed. Further, a biasing member holding groove 53 having a semicircular bottom is formed along the circumferential direction in outer peripheral surfaces of the main body portions 51a and the outer peripheral projecting pieces 51c. In the biasing member holding groove 53, a tensile coil spring 54 as a biasing member is disposed.

As shown in FIG. 17, the segment pieces 51 are connected with one another, with the engagement projections 52a of the outer peripheral projecting pieces 51c engaged with the engagement grooves 52b of the inner peripheral projecting pieces 51b. Consequently, the segment pieces 51 are assembled into the ring-shaped rod packing 50. As shown in FIG. 17, in the ring-shaped assembly state, between a tip surface of each of the inner peripheral projecting pieces 51b and the main body portion 51a of the adjacent segment piece 51 faced by this tip surface and between a tip surface of each of the outer peripheral projecting pieces 51c and the main body portion 51a of the adjacent segment piece 51 faced by this tip surface, appropriate buffer gaps G are preferably present. The tensile coil spring 54 is placed in the biasing member holding groove 53 of the rod packing 50 and is wound around an outer peripheral surface of the rod packing 50.

Figure 20:
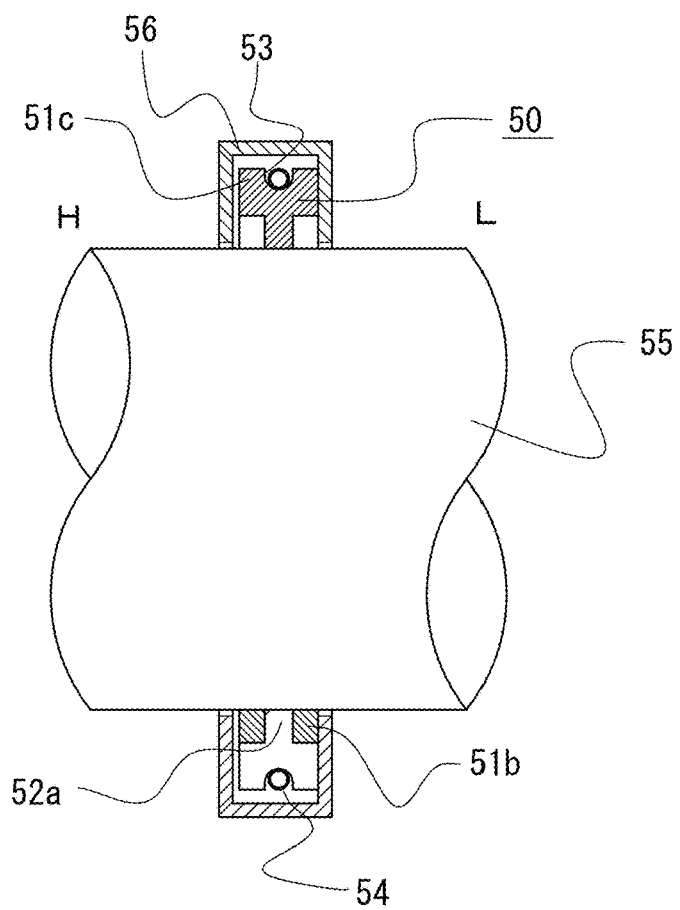
FIG. 20 shows a state where the rod packing in FIG. 17 is installed around a shaft while housed in a packing case, and illustrates the rod packing taken along the C-A line bent at the center of the rod packing.
Figure 21:
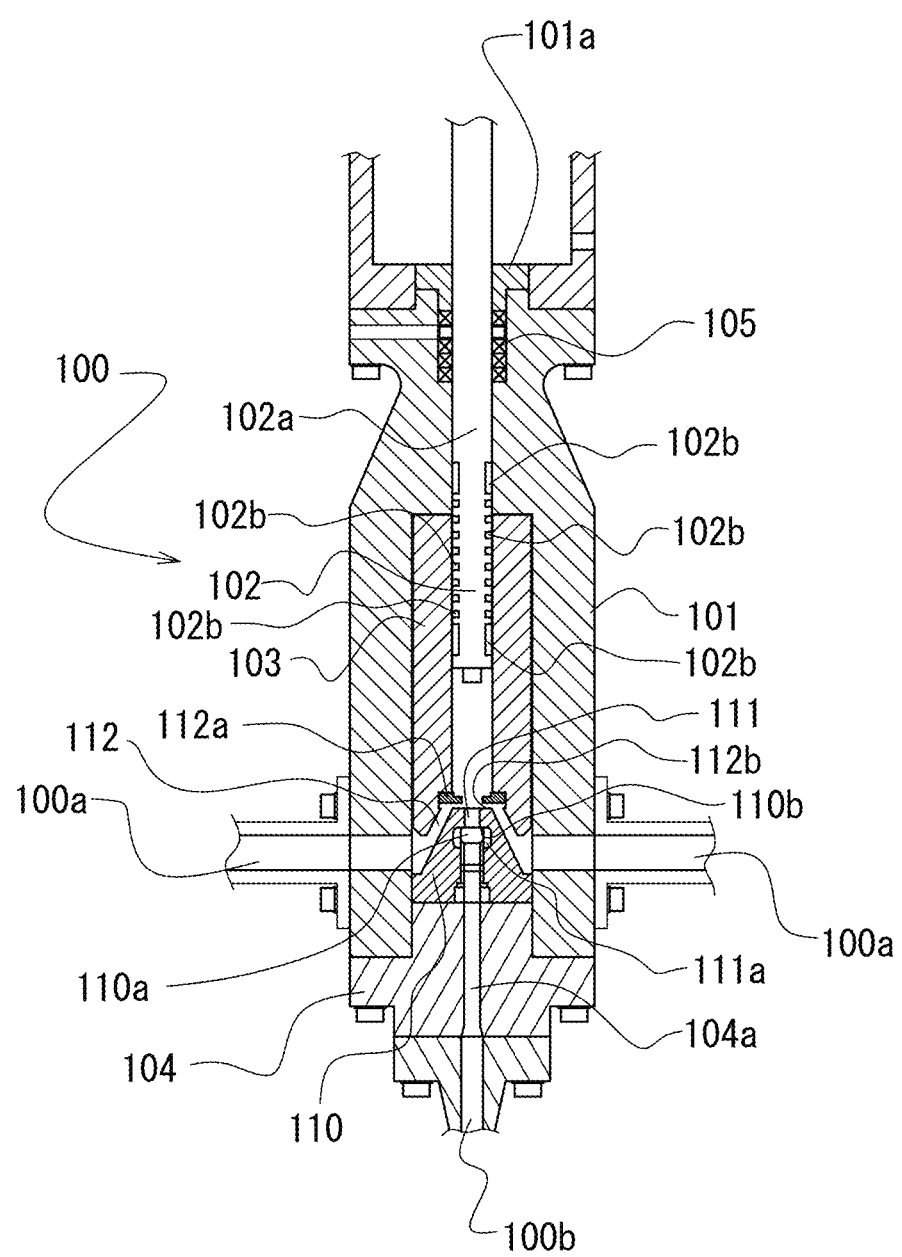
FIG. 21 is an explanatory view of a schematic structure of a piston pump using a piston-cylinder mechanism where the rod packing according to the present invention is preferably used, and shows its state in an intake stroke.
Figure 22:
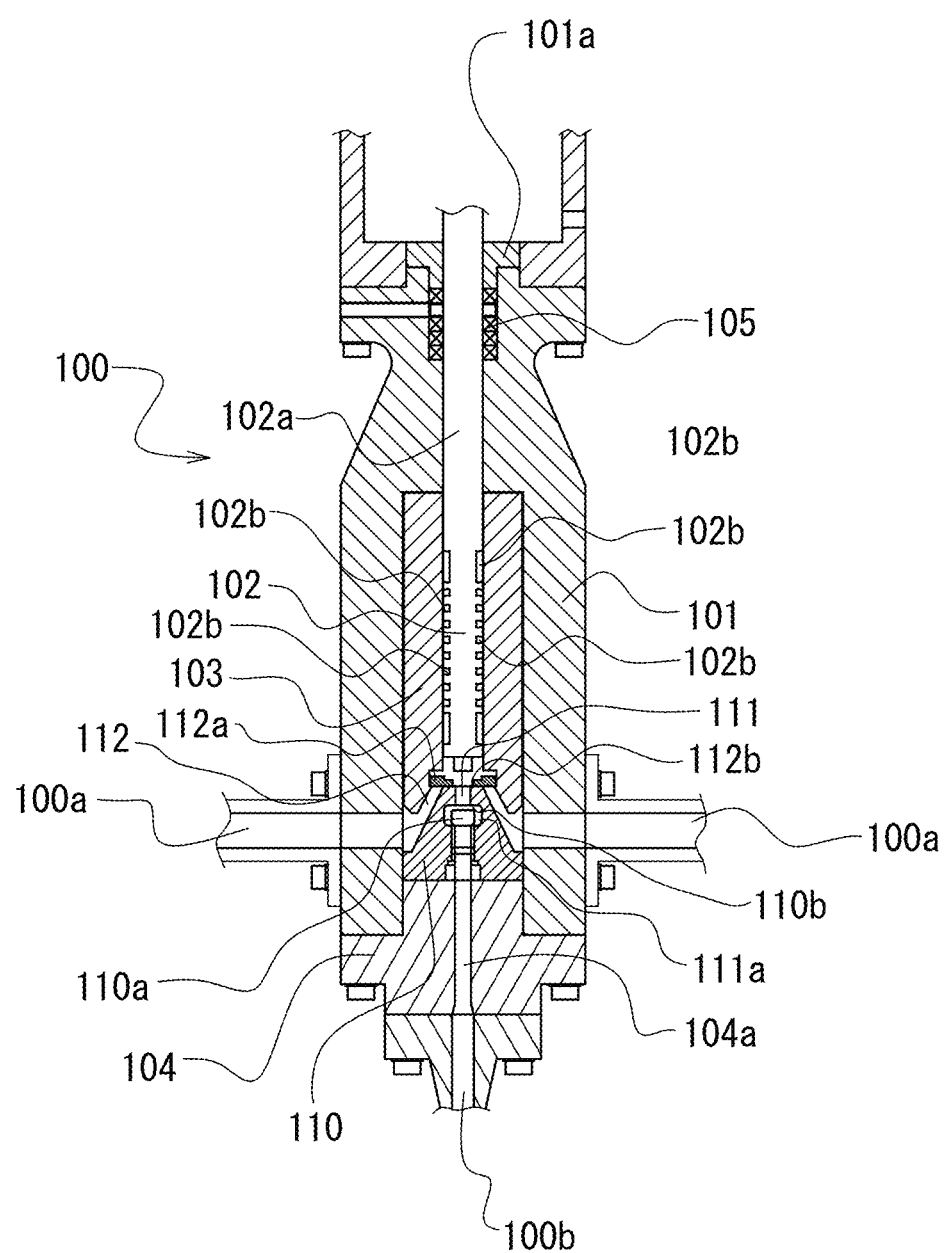
FIG. 22 is a view of the piston pump shown in FIG. 21 in a discharge stroke.
Figure 23:
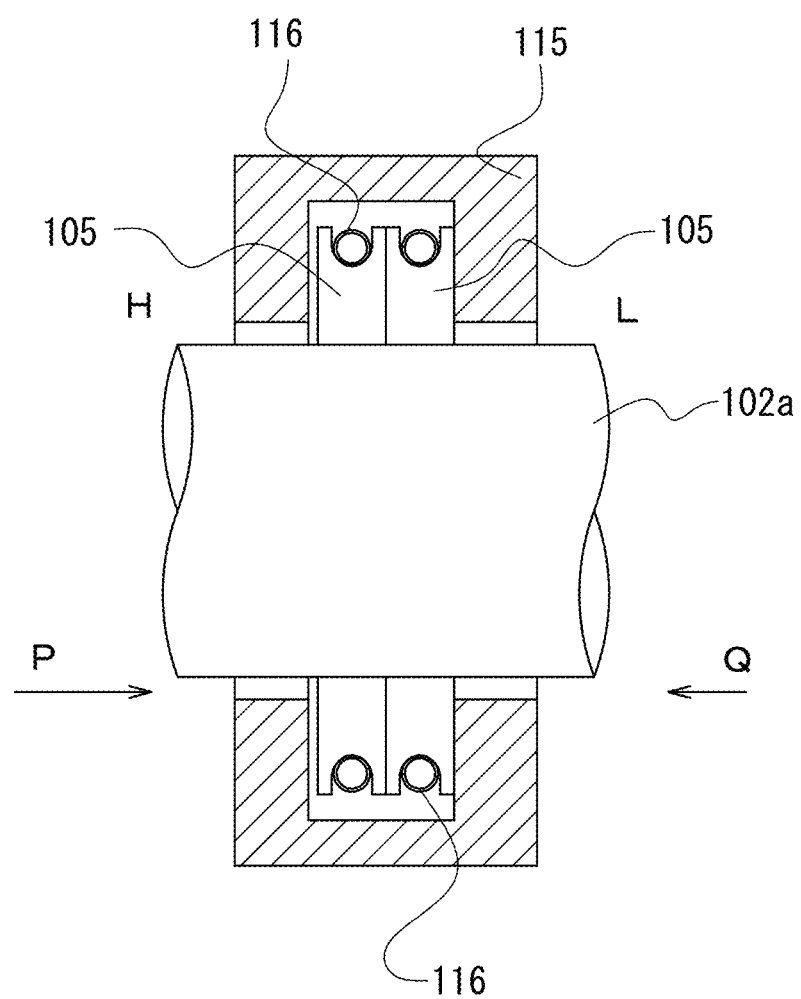
FIG. 23 is a schematic view showing an example of an installation state of conventional rod packings.
Figure 24:
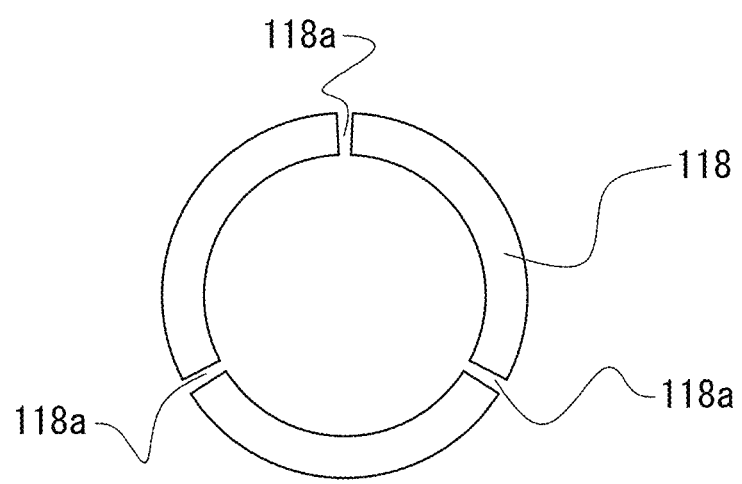
FIG. 24 is a plane view showing an example of the shape of a conventional rod packing.
Figures 25A, 25B:
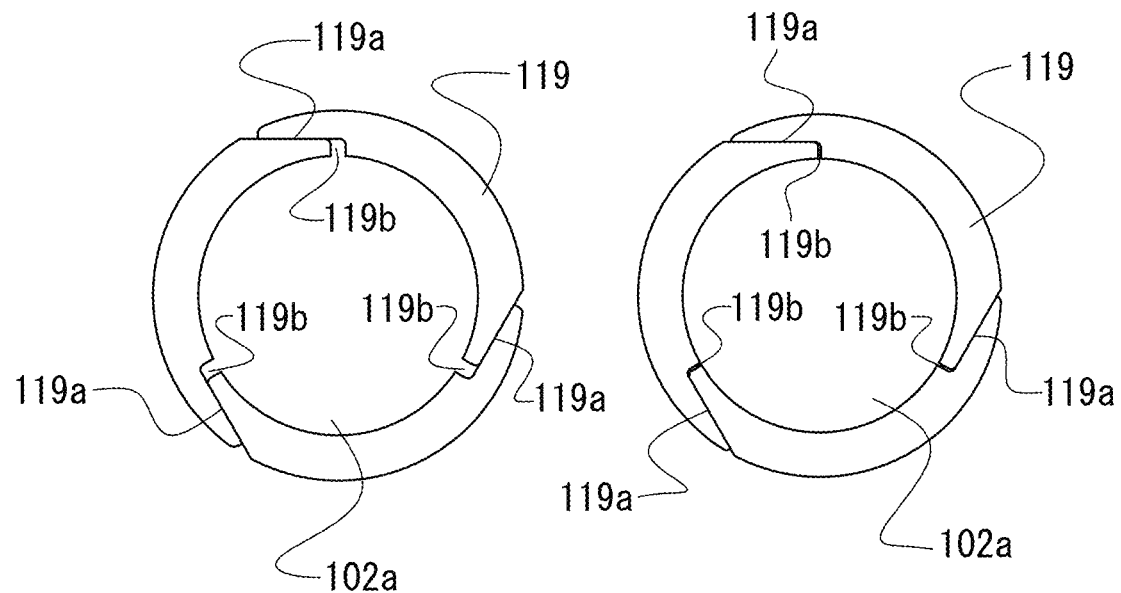
FIG. 25A is a plane view showing another example of the shape of a conventional rod packing before abrasion at a room temperature.
FIG. 25B is a plane view showing the conventional rod packing after abrasion.
Figures 26A, 26B:
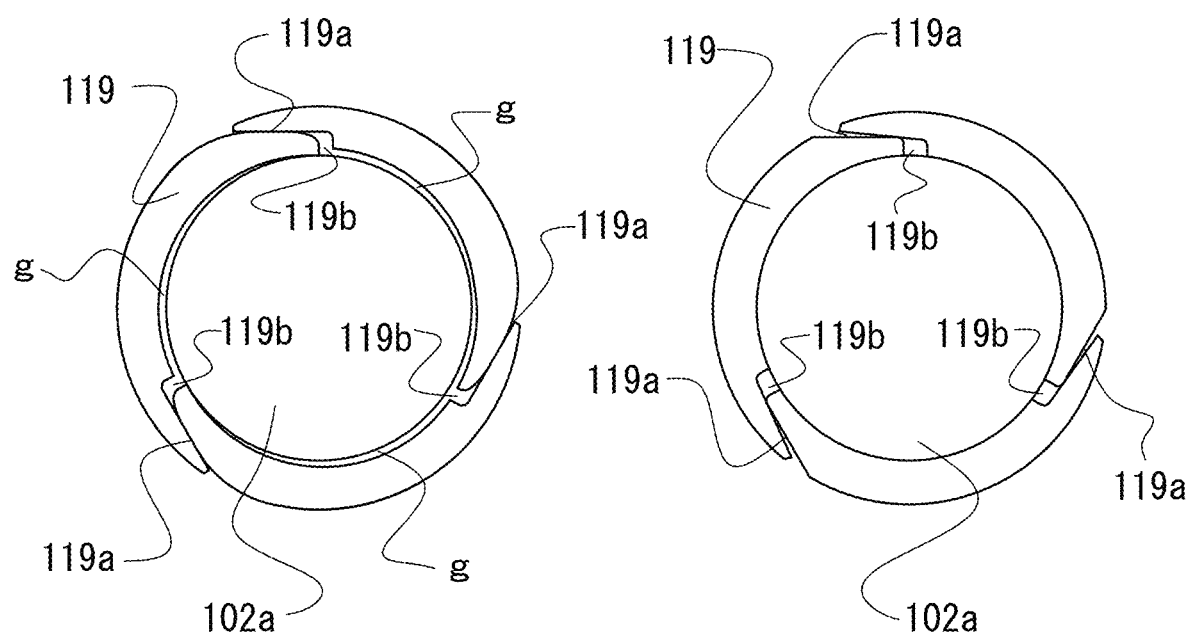
FIG. 26A is a view for explaining problems of the rod packing shown in FIG. 24 expanding.
FIG. 26B is a view for explaining problems of the rod packing shown in FIG. 24 contracting.

The rod packing 50 assembled from the connected segment pieces 51 is installed around a piston rod 55 as shown in FIG. 20. The rod packing 50 is installed around the piston rod 55 while housed in a packing case 56 which has a ring shape with a substantially U-shaped section and which is disposed with an open portion of the U-shape facing the piston rod 55.

Due to a pressure difference between the high-pressure side H and the low-pressure side L, the rod packing 50 is pressed against an inner surface on the low-pressure side L, of the packing case 56 to be in close contact with the packing case 56. Consequently, the high-pressure side H and the low-pressure side L are isolated from each other, achieving the sealing.

Further, when the temperature changes, the engagement projections 52a and the engagement grooves 52b slide relative to each other to change their engagement position, causing a change in the distance of the buffer gaps G, so that a change in the circumferential length of the rod packing 50 is absorbed. The tensile coil spring 54 expands/contracts to adapt to the change in the outside diameter of the rod packing 50 caused by the expansion/contraction of the rod packing 50, and the restoring force the tensile coil spring 54 acts in such a direction as to press the rod packing 50 against the piston rod 55. Consequently, the contact state between the rod packing 50 and the piston rod 55 is maintained.

When the rod packing 50 is scrubbed to abrade due to the reciprocating linear motion of the piston rod 55, the engagement projections 52a and the engagement grooves 52b slide relative to each other in such a direction as to increase an engagement area therebetween because the restoring force of the tensile coil spring 54 biases the rod packing 50 in such a direction as to radially contract the rod packing 50. Accordingly, the rod packing 50 radially contracts to maintain its contact state with the piston rod 50.

Since the segment pieces 51 forming the rod packing 50 of the fifth embodiment can all be formed with the same shape, the manufacture of the rod packing 50 is simple. In this embodiment, the rod packing 50 divided into six parts is described, but the number of division is not limited to six. Increasing the number of division makes it possible to reduce the contact area of each of the segment pieces with the piston rod 55, which facilitates the prevention of the leakage of a fluid.

The above-described embodiments all describe the structure in which the single rod packing is housed in the packing case, but a plurality of rod packings may be housed in the packing case. In the case where the plurality of rod packings are housed in the packing case, the packing case is elongated in the axial direction. As the plurality of housed rod packings, the rod packings according to the first embodiment to the fifth embodiment described above may be appropriately combined.

The above embodiments are described assuming that the rod packing is used at the shaft seal part of the piston rod which is a sliding shaft, but the rod packing is usable not only on the sliding shaft but on a rotary shaft.

The rod packing according to the invention fully maintains its contact state with the shaft even when abrading and even when expanding/contracting due to a temperature change. Therefore, its use in high-pressure LNG liquid pumps which are used in a situation with a large temperature change can be promoted, and the use of LNG as fuel of a large two-cycle low-speed diesel engine for ships where this high-pressure LNG liquid pump is used contributes to environmental conservation.

What is claimed is:

1. A resin-made rod packing in a ring shape which is disposed at a shaft seal part of a shaft made of metal while housed in a packing case, the rod packing comprising a ring member forming the ring shape, wherein the ring member includes:
a plurality of inner incision grooves which are arranged in a circumferential direction in an axial-direction of a first surface of the ring member and which each extend in a radial direction from an inner peripheral surface of an inner diameter of the ring member toward an outer peripheral surface of an outer diameter of the ring member, the inner incision groove having a depth in the radial direction;
a plurality of outer incision grooves which are arranged in the circumferential direction in the axial-direction of the first surface of the ring member and which each extend in the radial direction from an outer peripheral surface of an outer diameter of the ring member toward the inner peripheral surface of the inner diameter of the ring member, the outer incision groove having a depth in the radial direction; and
a plurality of inner-to-outer incision grooves which are formed in an axial-direction of a second surface of the ring member and extend in the radial direction from the inner peripheral surface of the inner diameter of the ring member toward the outer peripheral surface of the outer diameter of the ring member, the second surface being opposite to the first surface in the axial-direction, and the inner-to-outer incision groove having a depth in the radial direction;
the inner incision groove does not extend through the outer peripheral surface; and
the outer incision groove does not extend through the inner peripheral surface.

2. The rod packing according to claim 1, wherein a pair of the inner incision grooves and a pair of the outer incision grooves are alternately arranged, and in each of spaces between the pair of inner incision grooves and between the pair of outer incision grooves, the inner-to-outer incision groove is disposed.

3. The rod packing according to claim 1 or 2, wherein the inner-to-outer incision grooves face a high-pressure side.

4. The rod packing according to any one of claims 1 to 3, wherein in outer peripheral surface, a biasing member holding groove is formed along the circumferential direction, and
wherein a biasing member is disposed in the biasing member holding groove to bias the inner peripheral surface in such a direction as to press the inner peripheral surface against the shaft.

* * * * *